United States Patent
Chen et al.

(10) Patent No.: US 10,104,568 B2
(45) Date of Patent: Oct. 16, 2018

(54) PERIODIC CHANNEL STATE INFORMATION REPORTING FOR ENHANCED CARRIER AGGREGATION

(71) Applicant: QUALCOMM Incorporated, San Diego, CA (US)

(72) Inventors: Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 47 days.

(21) Appl. No.: 15/191,089

(22) Filed: Jun. 23, 2016

(65) Prior Publication Data

US 2017/0006491 A1 Jan. 5, 2017

Related U.S. Application Data

(60) Provisional application No. 62/187,034, filed on Jun. 30, 2015.

(51) Int. Cl.
*H04W 24/10* (2009.01)
*H04L 1/16* (2006.01)
(Continued)

(52) U.S. Cl.
CPC ............ *H04W 24/10* (2013.01); *H04B 7/024* (2013.01); *H04B 7/0626* (2013.01);
(Continued)

(58) Field of Classification Search
CPC .. H04W 24/10; H04W 74/004; H04L 1/0675; H04L 1/0687; H04L 1/0693;
(Continued)

(56) References Cited

U.S. PATENT DOCUMENTS 8,681,627 B2 * 3/2014 Choudhury ........... H04W 24/10
370/235
9,119,203 B2 * 8/2015 Ahn ..................... H04B 7/0639
(Continued)

OTHER PUBLICATIONS

ISA/EP, International Search Report and Written Opinion of the International Searching Authority, Int'l Application No. PCT/US2016/039364, dated Dec. 1, 2016, European Patent Office, Rijswijk, NL, 18 pgs.
(Continued)

*Primary Examiner* — Warner Wong
(74) *Attorney, Agent, or Firm* — Holland & Hart LLP

(57) ABSTRACT

Methods, systems, and devices for wireless communication are described. A user equipment (UE) may detect the size of a payload for reporting hybrid automatic repeat request (HARQ) feedback for transmissions on a set of component carriers (CCs) and may determine whether a scheduling request (SR) and/or a periodic channel state information (P-CSI) report is present. The UE may compare a size of an uplink control message, which may include a HARQ payload size and a payload for the SR or P-CSI report, with a threshold to select an uplink control format. The selected uplink control format maybe associated with a large number of CCs if the uplink control message has a payload size above a threshold. The UE may also use a configuration for transmitting two or more P-CSI reports during a subframe for CCs of a carrier aggregation (CA) configuration. P-CSI reports due for transmission during a given subframe.

30 Claims, 13 Drawing Sheets

(51) Int. Cl.
H04L 5/00 (2006.01)
H04B 7/024 (2017.01)
H04B 7/06 (2006.01)
H04J 11/00 (2006.01)
H04W 74/00 (2009.01)
H04L 1/18 (2006.01)
H04W 72/04 (2009.01)
H04W 72/12 (2009.01)

(52) U.S. Cl.
CPC .......... *H04J 11/005* (2013.01); *H04L 1/1671* (2013.01); *H04L 1/1812* (2013.01); *H04L 1/1861* (2013.01); *H04L 5/001* (2013.01); *H04L 5/0055* (2013.01); *H04W 74/004* (2013.01); *H04L 1/1864* (2013.01); *H04W 72/0413* (2013.01); *H04W 72/1226* (2013.01)

(58) Field of Classification Search
CPC ..... H04L 1/1812; H04L 5/001; H04L 5/0057; H04L 5/0026; H04L 5/0053; H04L 5/0055; H04L 1/18; H04L 1/1864; H04B 7/0626; H04B 7/024; H04J 11/005
See application file for complete search history.

(56) References Cited

U.S. PATENT DOCUMENTS

| | | | | |
|---|---|---|---|---|
| 9,743,392 B2* | 8/2017 | Nimbalker | ............ | H04L 5/0094 |
| 9,877,203 B2* | 1/2018 | Yoo | ............... | H04L 1/0003 |
| 9,974,064 B2* | 5/2018 | Han | ................ | H04W 72/0413 |
| 2010/0278109 A1* | 11/2010 | Papasakellariou | .... | H04L 5/0037 370/328 |
| 2011/0081932 A1* | 4/2011 | Astely | ............... | H04L 5/001 455/509 |
| 2011/0242982 A1 | 10/2011 | Lunttila et al. | | |
| 2011/0305161 A1* | 12/2011 | Ekpenyong | ............. | H04L 1/0031 370/252 |
| 2012/0039252 A1* | 2/2012 | Damnjanovic | ........ | H04L 1/0026 370/328 |
| 2012/0082042 A1* | 4/2012 | Lunttila | ............... | H04B 7/0626 370/252 |
| 2012/0099491 A1 | 4/2012 | Lee et al. | | |
| 2012/0099497 A1* | 4/2012 | Vaidya | ............... | G06F 1/3203 370/311 |
| 2012/0127869 A1* | 5/2012 | Yin | ............... | H04L 1/0031 370/252 |
| 2012/0134275 A1* | 5/2012 | Choi | ............... | H04L 5/0057 370/241 |
| 2012/0140708 A1* | 6/2012 | Choudhury | ......... | H04W 72/082 370/328 |
| 2012/0207123 A1* | 8/2012 | Seo | ............... | H04L 1/1861 370/329 |
| 2012/0220286 A1* | 8/2012 | Chen | ............... | H04W 24/10 455/422.1 |
| 2012/0300741 A1 | 11/2012 | Han et al. | | |
| 2012/0320805 A1 | 12/2012 | Yang et al. | | |
| 2013/0070720 A1* | 3/2013 | Pan | ............... | H04B 7/0626 370/329 |
| 2013/0077523 A1* | 3/2013 | Ko | ............... | H04W 24/00 370/252 |
| 2013/0100919 A1* | 4/2013 | Han | ............... | H04W 72/0413 370/329 |
| 2013/0242813 A1* | 9/2013 | Wang | ............... | H04L 5/001 370/280 |
| 2013/0267222 A1* | 10/2013 | Park | ............... | H04B 7/0619 455/422.1 |
| 2013/0279363 A1* | 10/2013 | Huang | ............... | H04L 5/001 370/252 |
| 2013/0294352 A1 | 11/2013 | Park et al. | | |
| 2013/0322358 A1* | 12/2013 | He | ............... | H04W 72/0406 370/329 |
| 2013/0324140 A1* | 12/2013 | Kwon | ............... | H04B 7/0626 455/450 |
| 2013/0336214 A1* | 12/2013 | Sayana | ............... | H04B 7/024 370/328 |
| 2014/0010126 A1* | 1/2014 | Sayana | ............... | H04J 3/1694 370/280 |
| 2014/0023009 A1* | 1/2014 | Abe | ............... | H04W 24/10 370/329 |
| 2014/0071928 A1* | 3/2014 | Papasakellariou | ... | H04B 7/0417 370/329 |
| 2014/0105049 A1* | 4/2014 | Kim | ............... | H04W 24/10 370/252 |
| 2014/0233523 A1* | 8/2014 | Jang | ............... | H04L 5/0057 370/329 |
| 2014/0362797 A1 | 12/2014 | Aiba et al. | | |
| 2015/0009926 A1* | 1/2015 | Seo | ............... | H04L 1/0027 370/329 |
| 2016/0105905 A1* | 4/2016 | Vajapeyam | ....... | H04W 72/1263 370/330 |
| 2016/0192388 A1* | 6/2016 | Ekpenyong | ....... | H04W 72/1284 370/329 |
| 2016/0249244 A1* | 8/2016 | Xia | ............... | H04L 1/0023 |
| 2016/0277155 A1* | 9/2016 | Nissila | ............... | H04L 1/1812 |
| 2016/0295573 A1* | 10/2016 | Lee | ............... | H04L 1/0026 |
| 2016/0338041 A1* | 11/2016 | Li | ............... | H04L 5/0055 |
| 2017/0086170 A1* | 3/2017 | Takeda | ............... | H04L 5/1415 |
| 2017/0257156 A1* | 9/2017 | Ko | ............... | H04L 1/0026 |
| 2017/0303283 A1* | 10/2017 | Ng | ............... | H04W 72/0453 |
| 2017/0332267 A1* | 11/2017 | Kim | ............... | H04W 72/1289 |
| 2018/0035425 A1* | 2/2018 | Yang | ............... | H04W 72/0453 |
| 2018/0084543 A1* | 3/2018 | Lv | ............... | H04W 72/0413 |
| 2018/0102892 A1* | 4/2018 | Lunttila | ............... | H04L 5/0055 |

OTHER PUBLICATIONS

Nokia Networks, "Dynamic Adaptation of HARQ-ACK Feedback Size and PUCCH Format", 3GPP TSG-RAN WG1 Meeting #81, R1-152810, Fukuoka, Japan, May 25-29, 2015, 3 pgs., XP050969963, 3rd Generation Partnership Project.

China UNICOM, "PUCCH Format Enhancements Considering ACK/NACK Payload Size," 3GPP TSG RAN WG1 Meeting #81, R1-153280, Fukuoka, Japan, May 25-29, 2015, 2 pgs., XP050973868, 3rd Generation Partnership Project.

ISA/EPO, Partial International Search Report of the International Searching Authority, Int'l App. No. PCT/US2016/039364, dated Oct. 10, 2016, European Patent Office, Rijswijk, NL, 9 pgs.

* cited by examiner

PERIODIC CHANNEL STATE INFORMATION REPORTING FOR ENHANCED CARRIER AGGREGATION

CROSS REFERENCES

The present application for patent claims priority to U.S. Provisional Patent Application No. 62/187,034 by Chen et al., entitled "Periodic Channel State Information Reporting for Enhanced Carrier Aggregation," filed Jun. 30, 2015, assigned to the assignee hereof.

BACKGROUND

The following relates generally to wireless communication, and more specifically to periodic channel state information (P-CSI) reporting for enhanced carrier aggregation (eCA).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

A UE may send P-CSI reports to a base station to provide feedback on channel conditions. The number of scheduled P-CSI reports may increase in proportion to the number of different component carriers (CCs) the UE and base station use for communication. If the UE and the base station are communicating using a large number of CCs (e.g., in an enhanced or evolved CA (eCA) configuration), a large amount of information may be queued for uplink transmission. In some cases, the uplink control channel may not provide sufficient resources for transmission of the queued P-CSI reports together with other uplink control information such as hybrid automatic repeat request (HARQ) feedback.

SUMMARY

A user equipment (UE) may detect the size of a hybrid automatic repeat request (HARQ) payload for a set of component carriers (CCs). The UE may also determine that a scheduling request (SR) or a periodic channel state information (P-CSI) report is present (e.g., to be included in a TTI, to be included in a subframe, to be transmitted in a subframe, to be included in an uplink (UL) control message, to be included with HARQ feedback in a subframe, available for transmission in a subframe, etc.). If the combined uplink payload (e.g., the combined payload size of the HARQ and the SR or P-CSI report) is above a threshold, the UE may select a physical uplink control channel (PUCCH) format associated with, and that can support feedback for, a large number of CCs. If the payload is below the threshold, a format for a smaller number of CCs may be selected. In some cases, the UE may receive a configuration of two or more P-CSI reports during a subframe for a number of CCs of a carrier aggregation (CA) configuration. The UE may then prioritize the P-CSI reports due for transmission during a given subframe and may transmit at least one and possibly two or more of the reports according to the prioritization.

A method of wireless communication is described. The method may include detecting a size of a HARQ payload for reporting, in a subframe, HARQ feedback associated with transmissions on a plurality of CCs, determining that at least one of a SR, a periodic channel state information (P-CSI) report, or a combination thereof is to be included in the subframe, selecting a PUCCH format from a set of PUCCH formats based at least in part on a comparison of a size of an uplink control message with a threshold, wherein the uplink control message includes the HARQ payload and a payload for at least one of the SR or the P-CSI report, and transmitting the uplink control message in the subframe using the selected PUCCH format.

A mobile device. The mobile device may include means for detecting a size of a HARQ payload for reporting, in a subframe, HARQ feedback associated with transmissions on a plurality of CCs, means for determining that at least one of a SR or a periodic channel state information (P-CSI) report, or a combination thereof is to be included in the subframe, means for selecting a PUCCH format from a set of PUCCH formats based at least in part on a comparison of a size of an uplink control message with a threshold, wherein the uplink control message includes the HARQ payload and a payload for at least one of the SR or the P-CSI report, and means for transmitting the uplink control message in the subframe using the selected PUCCH format.

Another mobile device is described. The mobile device may include a processor, memory in electronic communication with the processor, and instructions stored in the memory and operable, when executed by the processor, to cause the mobile device to detect a size of a HARQ payload for reporting, in a subframe, HARQ feedback associated with transmissions on a plurality of CCs, determine that at least one of a SR or a periodic channel state information (P-CSI) report, or a combination thereof is to be included in the subframe, select a PUCCH format from a set of PUCCH formats based at least in part on a comparison of a size of an uplink control message with a threshold, wherein the uplink control message includes the HARQ payload and a payload for at least one of the SR or the P-CSI report, and transmit the uplink control message in the subframe using the selected PUCCH format.

A non-transitory computer-readable medium storing code for wireless communication is described. The code may include instructions executable to detect a size of a HARQ payload for reporting, in a subframe, HARQ feedback associated with transmissions on a plurality of CCs, determine that at least one of a SR or a periodic channel state information (P-CSI) report, or a combination thereof is to be included in the subframe, select a PUCCH format from a set of PUCCH formats based at least in part on a comparison of a size of an uplink control message with a threshold, wherein the uplink control message includes the HARQ payload and a payload for at least one of the SR or the P-CSI report, and transmit the uplink control message using the selected PUCCH format.

In some examples of the method, mobile devices, or non-transitory computer-readable medium described herein, the set of PUCCH formats may include a first PUCCH format associated with P-CSI reporting for one CC and a second PUCCH format associated with P-CSI reporting for two or more CCs. In some examples the set of PUCCH formats may include a first PUCCH format associated with reporting HARQ feedback for one CC, a second PUCCH format associated with reporting HARQ feedback for up to five CCs, and a third PUCCH format associated with reporting HARQ feedback for more than five CCs. Additionally or alternatively, some examples may include steps, features, means, or instructions for selecting the set of PUCCH formats based at least in part on a number of CCs in the plurality of CCs, and determining whether a size of the payload for the at least one of the SR or P-CSI report is included in the size of the uplink control message for the comparison with the threshold based at least in part on the selected set of PUCCH formats. In some examples, when the size of the uplink control message is greater than the threshold, the method, mobile devices, or non-transitory computer-readable medium may include operations, features, means, or instructions for selecting a PUCCH format having a greater capacity than at least one other PUCCH format from the set of PUCCH formats. In some examples the threshold may have a size of 22 bits.

In some examples of the method, mobile devices, or non-transitory computer-readable medium described herein, selecting the PUCCH format may include steps, features, means or instructions for selecting the third PUCCH format based at least in part on the uplink control message size exceeding the threshold. Additionally or alternatively, some examples may include steps, features, means, or instructions for multiplexing the HARQ payload with P-CSI reports for two or more CCs configured for the UE, and determining that at least one of an SR or a P-CSI report is to be included in the subframe may include identifying the P-CSI reports for the two or more CCs configured for the UE.

In some examples of the method, mobile devices, or non-transitory computer-readable medium described herein, the SR is determined to be present and the uplink control message may include the HARQ payload and a payload for the SR. Additionally or alternatively, in some examples the SR and the P-CSI report are determined to be present and the uplink control message may include the HARQ payload, a payload for the SR, and a payload for the P-CSI.

In some examples of the method, mobile devices, or non-transitory computer-readable medium described herein, the PUCCH format is selected based at least in part on a scaled P-CSI report payload size. In some examples the P-CSI report may include a report from at least one P-CSI process from a plurality of P-CSI processes for a CC configured for the UE, a report from a P-CSI process for at least one P-CSI subframe set from a plurality of P-CSI subframe sets for a CC configured for the UE, or a combination thereof. Additionally or alternatively, in some examples determining that at least one of the SR or the P-CSI report is to be included in the subframe may include steps, features, means, or instructions for determining to report a subset of P-CSI reports from a set of P-CSI reports. In some examples determining to report a subset of P-CSI reports from a set of P-CSI report types reports may include steps, features, means, or instructions for prioritizing P-CSI reports based on P-CSI report types, the prioritizing performed within a CC configured for the UE, or across CCs configured for the UE, or a combination thereof. In some examples determining to report a subset of P-CSI reports from a set of P-CSI reports may include steps, features, means, or instructions for prioritizing based on P-CSI report types, followed by prioritizing based on a CSI process identification, followed by prioritizing based on a CC index, followed by prioritizing based on a subframe set index.

In some examples of the method, mobile devices, or non-transitory computer-readable medium described herein, the set of P-CSI report types includes P-CSI report types that support rank indicator (RI) feedback or wideband precoding matrix indicator (PMI) feedback. Additionally or alternatively, some examples may include steps, features, means, or instructions for receiving signaling indicative of the HARQ payload size from a network node.

Some examples of the method, mobile devices, or non-transitory computer-readable medium described herein may further include steps, features, means, or instructions for receiving signaling indicative of whether to consider a presence of the at least one of the SR or the P-CSI report in the selection of the PUCCH format. Additionally or alternatively, in some examples the signaling includes radio resource control (RRC) signaling. Some examples of the method, mobile devices, or non-transitory computer-readable medium may include steps, features, means, or instructions for receiving RRC signaling indicative of the threshold.

In some examples of the method, mobile devices, or non-transitory computer-readable medium described herein, the uplink control message is associated with a cell group among a plurality of cell groups.

Another method of wireless communication is described. The method may include receiving a configuration supporting transmission of a plurality of periodic channel state information (P-CSI) reports during a same TTI, wherein the P-CSI reports are associated with two or more of P-CSI reports for a plurality of subframe sets of a CSI process, P-CSI reports for a plurality of CSI processes of a CC, or P-CSI reports for a plurality of CCs of a CA configuration, determining two or more P-CSI reports due for transmission during a TTI, and transmitting at least one of the P-CSI reports during the TTI according to a prioritization rule.

Another mobile device is described. The mobile device may include means for receiving a configuration supporting transmission of a plurality of periodic channel state information (P-CSI) reports during a TTI, wherein the plurality of P-CSI reports are associated with two or more of P-CSI reports for a plurality of subframe sets of a CSI process, P-CSI reports for a plurality of CSI processes of a CC, or P-CSI reports for a plurality of CCs of a CA configuration, means for determining two or more P-CSI reports due for transmission during a TTI, and means for transmitting at least one of the P-CSI reports during the TTI according to a prioritization rule.

Another mobile device is described. The mobile device may include a processor, memory in electronic communication with the processor, and instructions stored in the memory and operable, when executed by the processor, to cause the mobile device to receive a configuration supporting transmission of a plurality of periodic channel state information (P-CSI) reports during a TTI, wherein the plurality of P-CSI reports are associated with two or more of P-CSI reports for a plurality of subframe sets of a CSI process, P-CSI reports for a plurality of CSI processes of a CC, or P-CSI reports for a plurality of CCs of a CA configuration, determine two or more P-CSI reports due for transmission during a TTI, and transmit at least one of the P-CSI reports during the TTI according to a prioritization rule.

Another non-transitory computer-readable medium storing code for wireless communication is described. The code may include instructions executable to receive a configuration supporting transmission of a plurality of periodic channel state information (P-CSI) reports during a TTI, wherein the plurality of P-CSI reports are associated with two or more of P-CSI reports for a plurality of subframe sets of a CSI process, P-CSI reports for a plurality of CSI processes of a CC, or P-CSI reports for a plurality of CCs of a CA configuration, determine two or more P-CSI reports due for transmission during a TTI, and transmit at least one of the P-CSI reports during the TTI according to a prioritization rule.

In some examples of the method, mobile devices, or non-transitory computer-readable medium described herein, the prioritization rule is performed based at least in part on a payload capacity or payload sizes of the two or more P-CSI reports. Additionally or alternatively, in some examples the payload capacity is based at least in part on a PUCCH format.

In some examples of the method, mobile devices, or non-transitory computer-readable medium described herein, the configuration supporting transmission of the plurality of P-CSI reports includes at least one of a coordinated multipoint (CoMP) configuration, a CA configuration with one or more PUCCH groups, a dual-connectivity configuration, or an interference mitigation and traffic adaptation (IMTA) configuration. Additionally or alternatively, in some examples the prioritization rule includes prioritizing a CSI type, followed by a CSI process identification (ID), followed by a CC index, followed by a subframe set index.

In some examples of the method, mobile devices, or non-transitory computer-readable medium described herein, the CA configuration includes a configuration of more than five CCs.

BRIEF DESCRIPTION OF THE DRAWINGS

Aspects of the disclosure are described in reference to the following figures.

DETAILED DESCRIPTION

Figure 1:
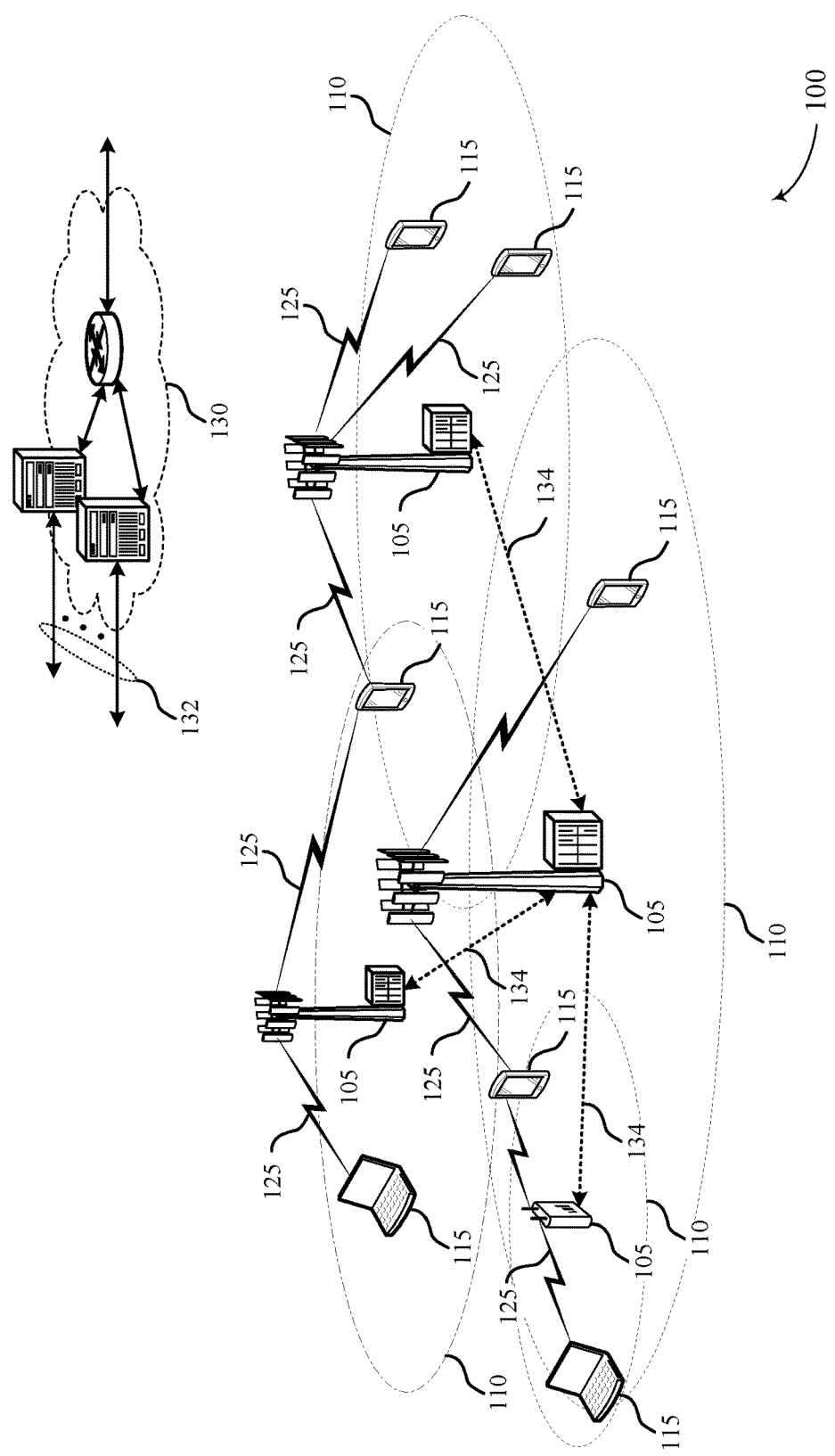
FIG. 1 illustrates an exemplary wireless communications system that supports periodic channel state information (P-CSI) reporting for enhanced carrier aggregation (eCA) in accordance with various aspects of the present disclosure.

In some wireless systems, a user equipment (UE) can be configured with a number component carriers (CC) for carrier aggregation (CA) operation. The UE can be configured to report channel conditions for each CC with periodic CSI (P-CSI) reports. The size of uplink control information transmissions may increase as the number of CCs in the CA configuration increases. Thus, different physical uplink control channel (PUCCH) formats may be used depending on the number of CCs. As disclosed herein, the UE may select a particular PUCCH format for an uplink control message based on the relative importance placed on P-CSI reporting. Techniques for supporting multiple P-CSI reports for a single CC, such as in support of certain operations in an eCA configuration, are also described.

In some cases when a UE is configured to provide P-CSI feedback for multiple CCs in an uplink control message (e.g., in a TTI, in a subframe, etc.), the UE may be subject reporting limits such that only a subset of the CSI reports may be reported. For example, the UE may be limited to a single P-CSI report for each CC. Thus, if there are two or more P-CSI reports due for the same CC, one P-CSI report may be reported while all others are dropped. A UE may apply prioritization rules across the CCs, and within each CC, based on the capacity of the PUCCH format in use (e.g., CSI type first, followed by a CSI process ID, followed by CC index, followed by subframe set ID). In other cases, a UE may be configured to prioritize P-CSI reporting, and may select a PUCCH format likely to support (e.g., having sufficient communication resource capacity for) P-CSI reporting in addition to other uplink control information.

In some wireless systems, a UE may be limited to a certain number of CCs (e.g., 5 CCs). In other systems, a UE may be configured for a larger number of CCs (e.g., up to 32 CCs in an enhanced carrier aggregation (eCA) configuration). ECA configurations may also support PUCCH transmissions on both primary and secondary CCs for UEs supporting uplink CA. Some sets of PUCCH formats may support CA while others may support eCA.

In response to different uplink control information combinations, different PUCCH formats may be selected (e.g., for a TTI or subframe used to transmit an associated uplink control message). In some cases, the selection of the possible set of PUCCH formats may be based on a HARQ condition determined by the UE. For non-CA scheduling, non-CA PUCCH formats may be selected. For CA scheduling, CA PUCCH formats may be selected. As discussed herein, non-CA PUCCH formats may refer to those PUCCH formats that support fewer bits of uplink control information (UCI) and thus may not support (e.g., may have insufficient communication resource capacity for) UCI transmission for CA configurations. CA PUCCH formats may refer to those PUCCH formats that support a larger number of bits for UCI and therefore support UCI transmission for CA configurations.

If P-CSI is not involved in a PUCCH format determination, a UE may determine a PUCCH format to use based on hybrid automatic repeat request (HARQ) acknowledgement/negative acknowledgement (ACK/NACK) and then may determine how to multiplex P-CSI. In cases in which P-CSI can be multiplexed with HARQ ACK/NACK, P-CSI may be used to determine which PUCCH format should be used. In some examples, a scheduling request (SR) may also be involved in PUCCH format determination.

Aspects of the disclosure introduced above are described below in the context of a wireless communication system. Specific examples are then described for selecting which PUCCH format to use from a set of PUCCH formats, and transmitting an uplink control message using the selected PUCCH format. Examples are also described for determining the presence of a collision of P-CSI reports during a TTI, and transmitting one or more P-CSI reports based on a prioritization rule during the TTI. These and other aspects of the disclosure are further illustrated by and described with reference to apparatus diagrams, system diagrams, and flowcharts that relate to P-CSI in eCA.

FIG. 1 illustrates an example of a wireless communications system 100 that supports P-CSI reporting for eCA in accordance with various aspects of the present disclosure. The wireless communications system 100 includes base stations 105, user equipment (UEs) 115, and a core network 130. In some examples, the wireless communications system 100 may be a Long Term Evolution (LTE)/LTE-Advanced (LTE-A) network. Wireless communications system 100 may be configured to support a large number of CCs for communications between UEs 115 and base stations 105. For example, UEs 115 may be configured to support prioritization of P-CSI reports and to transmit PUCCH using an expanded set of PUCCH formats.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A UE 115 may be configured to collaboratively communicate with multiple base stations 105 through, for example, Multiple Input Multiple Output (MIMO), Coordinated Multi-Point (CoMP), or other schemes. MIMO techniques may use multiple antennas on the base stations or multiple antennas on the UE to take advantage of multipath environments to transmit multiple data streams. CoMP includes techniques for dynamic coordination of transmission and reception by a number of eNBs to improve overall transmission quality for UEs 115 as well as increasing network and spectrum utilization. CoMP configurations may affect a P-CSI reporting (e.g., a CSI process for P-CSI) of a UE 115, and thus may affect the PUCCH format selection or P-CSI report prioritization of the UE 115.

The wireless communications system 100 may also employ Interference Management and Traffic Adaptation (IMTA) or enhanced IMTA (eIMTA) techniques. IMTA/ eIMTA may include techniques for flexible resources of a time-division duplexing (TDD) carrier based on traffic load considerations. For example, IMTA may involve transmitting DL data in UL frames when DL traffic is heavy, or reserving flexible subframes that may be used for either UL or DL. IMTA may also involve techniques for coordinated power control and interstation scheduling. IMTA configurations may also affect a P-CSI reporting (e.g., a subframe set for P-CSI) of a UE 115, and thus may affect a PUCCH format selection or P-CSI report prioritization of the UE 115.

A communication link 125 may include one or more frequency ranges organized into carriers. A carrier may also be referred to as a CC, a layer, a channel, etc. The term "component carrier" may refer to each of the multiple carriers utilized by a UE in carrier aggregation (CA) operation, and may be distinct from other portions of system bandwidth. For instance, a CC may be a relatively narrow-bandwidth carrier that supports being utilized independently or in combination with other CCs. Each CC may provide the same capabilities as an isolated carrier based on release 8 or release 9 of the LTE standard.

Multiple CCs may be aggregated or utilized concurrently to provide some UEs 115 with greater bandwidth, which may support higher data rates. Thus, individual CCs may be backwards compatible with legacy UEs 115 (e.g., UEs 115 implementing LTE release 8 or release 9), while other UEs 115 (e.g., UEs 115 implementing post-release 8/9 LTE versions), may be configured with multiple CCs in a multi-carrier mode. A carrier used for downlink (DL) may be referred to as a DL CC, and a carrier used for uplink (UL) may be referred to as an UL CC. A UE 115 may be configured with multiple DL CCs and one or more UL CCs for carrier aggregation. Each carrier may be used to transmit control information (e.g., reference signals, control channels, etc.), overhead information, data, etc. A UE 115 may communicate with a single base station 105 utilizing multiple carriers, and may also communicate with multiple base stations simultaneously on different carriers.

In some cases, wireless communications system 100 may utilize one or more enhanced component carriers (eCCs). An eCC may be characterized by one or more features including: flexible bandwidth, different transmission time interval (TTIs), and modified control channel configuration. In some cases, an eCC may be associated with a CA configuration or a dual connectivity configuration (e.g., when multiple serving cells have a suboptimal backhaul link). An eCC may also be configured for use in an unlicensed radio frequency spectrum band or a shared radio frequency spectrum band (e.g., where more than one operator is licensed to use the radio frequency spectrum band). An eCC characterized by flexible bandwidth may include one or more bandwidth segments that may be utilized by UEs 115 that do not or are not capable of monitoring the whole bandwidth or are otherwise configured to use a limited bandwidth (e.g., to conserve power).

Each cell of a base station 105 may include an UL CC and a DL CC. The geographic coverage area 110 of each serving cell for a base station 105 may be different (e.g., CCs on different frequency bands may experience different path loss). In some examples, one carrier is designated as the primary carrier, or primary component carrier (PCC), for a UE 115, which may be served by a primary cell (PCell). Primary cells may be semi-statically configured by higher layers (e.g., radio resource control (RRC) layer, etc.) on a per-UE basis. Certain UCI (e.g., ACK/NACK), channel quality indicator (CQI), and scheduling information transmitted on physical uplink control channel (PUCCH) may be carried by the primary cell. Additional carriers may be designated as secondary carriers, or secondary component carriers (SCC), which may be served by secondary cells (SCells). Secondary cells may also be semi-statically configured on a per-UE basis. In some cases, secondary cells may not include or may not be configured to transmit the same control information as the primary cell. In other cases, one or more secondary cell (SCells) may be designated to carry physical uplink control channel (PUCCH), and the SCells may be organized into PUCCH groups based on which CC is used to carry the associated UL control information. Some wireless networks may utilize enhanced CA operations based on a large number of carriers (e.g., between 5 and 32 carriers), operation in an unlicensed radio frequency spectrum band, or use of enhanced CCs. Operation with a large number of carriers may be characterized by modified control configurations such as modified PUCCH procedures to report CSI information.

PUCCH may be used for UL HARQ ACK/NACK, SRs, CQI, and other UL control information. A PUCCH may be mapped to a control channel defined by a code and two consecutive resource blocks. UL control signaling may depend on the presence of timing synchronization for a cell. PUCCH resources for scheduling request (SR) and channel quality indicator (CQI) reporting may be assigned or revoked through radio resource control (RRC) signaling. In some cases, resources for SR may be assigned after acquiring synchronization through a random access channel (RACH) procedure. In other cases, an SR may not be assigned to a UE 115 through the RACH (i.e., synchronized UEs 115 may or may not have a dedicated SR channel). PUCCH resources for SR and CQI may be lost when the UE 115 is no longer synchronized. In some cases, PUCCH formats may be selected based on the size of an uplink control payload which may include HARQ, CSI, and SR information. If a large number of CCs are configured, expanded PUCCH formats may be used to accommodate large PUCCH payloads.

HARQ may be a method of ensuring that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., poor signal-to-noise ratio conditions). In Incremental Redundancy HARQ, incorrectly received data may be stored in a buffer and combined with subsequent transmissions to improve the overall likelihood of successfully decoding the data. In some cases, redundancy bits are added to each message prior to transmission. This may be especially useful in poor radio conditions. In other cases, redundancy bits are not added to each transmission, but are retransmitted after the transmitter of the original message receives a NACK indicating a failed attempt to decode the information. The chain of transmission, response and retransmission may be referred to as a HARQ process. In some cases, a limited number of HARQ processes may be used for a given communication link 125.

A base station 105 may insert periodic pilot symbols such as cell-specific reference signals (CRS) to aid UEs 115 in channel estimation and coherent demodulation. CRS may include one of 504 different cell identities. They may be modulated using quadrature phase shift keying (QPSK) and power boosted (e.g., transmitted at 6 dB higher than the surrounding data elements) to make them more resilient to noise and interference. CRS may be embedded in 4 to 16 resource elements in each resource block based on the number of antenna ports or layers (up to 4) of the receiving UEs 115. In addition to CRS, which may be utilized by all UEs 115 in the geographic coverage area 110 of the base station 105, demodulation reference signal (DMRS) may be directed toward specific UEs 115 and may be transmitted only on resource blocks assigned to those respective UEs 115. In some cases, additional reference signals known as channel state information reference signals (CSI-RS) may be included to aid in generating CSI. On the UL, a UE 115 may transmit a combination of periodic sounding reference signal (SRS) and UL DMRS for link adaptation and demodulation, respectively.

A base station 105 may gather channel condition information from a UE 115 based on the pilot symbols in order to efficiently configure and schedule the channel. This information may be sent from the UE 115 in the form of a channel state report. A channel state report may contain a rank indicator (RI) requesting a number of layers to be used for DL transmissions (e.g., based on the antenna ports of the UE 115), a precoding matrix indicator (PMI) indicating a preference for which precoder matrix should be used (e.g., based on the number of layers), and a CQI representing the highest modulation and coding scheme (MCS) that may be used. CQI may be calculated by a UE 115 after receiving predetermined pilot symbols such as CRS or CSI-RS. RI and PMI may be excluded if the UE 115 does not support spatial multiplexing (or is not operating in a mode that supports spatial multiplexing). The types of information included in the report determines a reporting type. Channel state reports may be periodic or aperiodic. That is, a base station 105 may configure a UE 115 to send periodic reports at regular intervals, and may also request additional reports as needed. Aperiodic reports may include wideband reports indicating the channel quality across an entire cell bandwidth, UE-selected reports indicating a subset of the best subbands, or configured reports in which the subbands reported are selected by the base station 105. In some cases, a UE 115 may prioritize some P-CSI reports over others to ensure that higher priority reports are transmitted to a base station 105 when multiple P-CSI reports are scheduled for the same subframe.

Some examples of possible P-CSI report types include: a Type 1 report, which may support CQI feedback; a Type 1a report, which may support subband CQI and second PMI feedback, Type 2, Type 2b, and Type 2c reports, which may support wideband CQI and PMI feedback; a Type 2a report, which may support wideband PMI feedback; a Type 3 report, which may support RI feedback; a Type 4 report, which may support wideband CQI; a Type 5 report, which may support RI and wideband PMI feedback; and a Type 6 report, which may support RI and precoder type indication (PTI) feedback.

In some cases, a UE 115 may detect the size of a HARQ payload for reporting HARQ feedback associated with transmissions on a set of CCs. The UE 115 may also determine that a SR or a P-CSI report may be present (e.g., to be included in a TTI, to be included in a subframe, to be transmitted in a subframe, to be included in an uplink (UL) control message, to be included with HARQ feedback in a subframe, available for transmission in a subframe, etc.). If the combined uplink payload is above a threshold, the UE 115 may select a PUCCH format associated with a large number of CCs. If the payload is below the threshold, a format for a smaller number of CCs may be selected. In some cases, the UE 115 may receive a configuration of two or more P-CSI reports during a subframe for a number of CCs of a CA configuration. The UE 115 may then prioritize the P-CSI reports due for transmission during a given subframe and may transmit at least one of the reports (e.g., at least a subset of the configured P-CSI reports) according to the prioritization.

Figure 2:
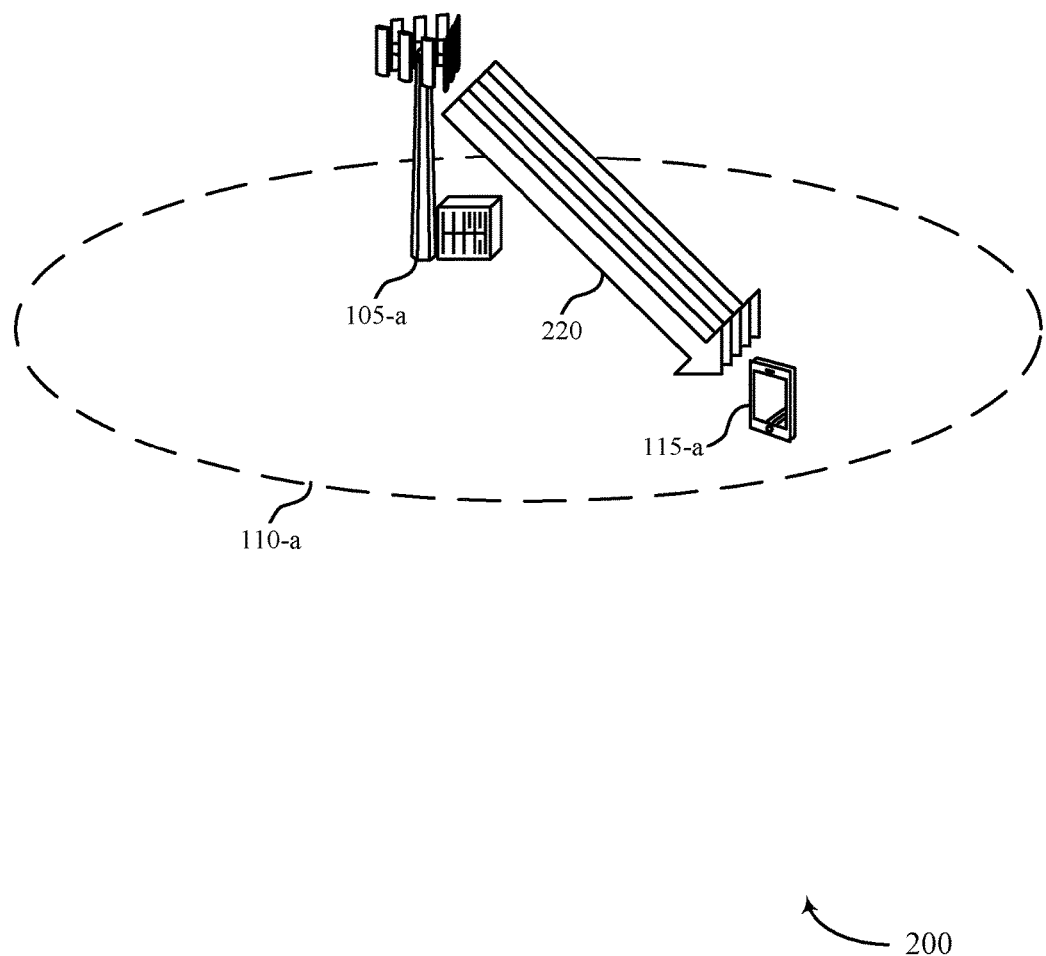
FIG. 2 illustrates an exemplary wireless communications system that supports aspects of P-CSI reporting for eCA in accordance with various aspects of the present disclosure.

FIG. 2 illustrates an example of a wireless communications system 200 that supports P-CSI reporting in eCA in accordance with various aspects of the present disclosure. Wireless communications system 200 may include a UE 115-*a* and base station 105-*a*, which may be examples of a UE 115 and base station 105 described with reference to FIG. 1. Wireless communications system 200 may be configured to support a large number of CCs 220 for communications between UE 115-*a* and base station 105-*a*. For example, UE 115-*a* may be configured to support prioritization of P-CSI reports and to transmit PUCCH using an expanded set of PUCCH formats.

Although some examples are described with respect to LTE systems, the methods and mobile devices described herein may be extended to other wireless systems. For example, embodiments of the present disclosure may be extended or modified to be used with WiMAX, UMB, or other 3G or 4G wireless systems that may or may not support CA.

In some wireless systems, a UE 115 may be limited to a certain number of CCs (e.g., 5 CCs). In other systems, a UE 115 may be configured for a larger number of CCs (e.g., up to 32 CCs) in an enhanced carrier aggregation (eCA) configuration. ECA configurations may also support PUCCH transmissions on both primary and secondary CCs for UEs supporting uplink CA, as mentioned above. UE 115-*a* may represent a UE 115 configured with a large number of CCs (e.g., more than 5).

UE 115-*a* may be configured to report channel conditions for each CC via P-CSI transmissions with a certain periodicity. In some examples when a UE 115-*a* is configured to provide P-CSI feedback for multiple CCs in a subframe, it may be subject reporting limits. If there are two or more P-CSI reports due for the same CC, a subset of the P-CSI reports (e.g., one P-CSI report) from a set of P-CSI reports may be reported while others are dropped. In some examples different PUCCH formats may be selected in response to different uplink control information combinations. For non-CA scheduling, non-CA PUCCH formats may be selected. For CA scheduling, CA PUCCH formats may be selected. If P-CSI is not involved in a selection, UE 115-*a* may determine a PUCCH format based on HARQ alone, and may then multiplex P-CSI with a HARQ payload. If P-CSI is involved in a selection, the P-CSI may be multiplexed with the HARQ payload prior to comparison to the threshold. SR may also be involved in PUCCH format determination.

In some cases, one CC may be configured as the PCC for UE 115-*a*. In some examples, the PCC may be the only CC that carries PUCCH and a common search space for UE 115-*a*. In some wireless systems, PUCCH may be enabled on two CCs in CA for UE 115-*a*. In such cases, in addition to the PCC, one or more secondary cells may carry PUCCH. For example, this capability may be utilized for dual-connectivity and PUCCH load balancing. In dual connectivity, base station 105-*a* may not have an ideal backhaul with other base station 105 (not shown) supporting CCs for UE 115-*a*. Tight coordination between the cells may not be possible due to limited backhaul capacity and non-negligible backhaul latency (e.g., tens of milliseconds). In dual-connectivity, cells may be partitioned into two groups, the primary cell group (PCG) and the secondary cell group (SCG). Each group may have one or more cells in carrier aggregation. Each group may also have a single cell carrying PUCCH, where the PCell in PCG carries PUCCH for the PCG and a primary SCell (PSCell) in the SCG carries PUCCH for the SCG. Additionally, a common search space may be monitored in the SCG by UE 115-*a*. In some cases, uplink control information is separately conveyed to each group using the PUCCH in each group.

In some examples, UE 115-*a* may be configured with P-CSI transmission with a certain periodicity and subframe offset (e.g., a number of subframes between a DL subframe received from a base station 105 and a responsive P-CSI report by the UE 115-*a*). P-CSI configuration may be separate for different CCs in CA, each CSI process if there are more than one CSI processes in CC, and each subframe set if a CSI process has more than one subframe sets. In some cases, there may be two or more CSI types for a CC due in the subframe and, in some cases, only a subset (e.g., one type) can be transmitted. Furthermore, if two or more CSI reports across CCs are due in the subframe, only a subset (e.g., one CC's P-CSI report) may be transmitted while other reports in collision may be dropped. In various examples, determining to report a subset of P-CSI reports may include prioritizing P-CSI reports based on P-CSI report types, which may include a prioritization within a CC configured for the UE 115-*a*, or across CCs configured for the UE 115-*a*, or a combination thereof. Additionally or alternatively, P-CSI reports may include a report from at least one P-CSI process from a plurality of P-CSI processes for a CC configured for the UE 115-*a*, a report from a P-CSI process for at least one P-CSI subframe set from a plurality of P-CSI subframe sets for a CC configured for the UE 115-*a*, or a combination thereof. In some cases, P-CSI reports may be transmitted along with HARQ ACK/NACK using, for example, PUCCH format 2/2a/2b (e.g., if a PCell is scheduled in the primary group, or if the PUCCH enabled cell is scheduled in the secondary group) and PUCCH format 3 under CA and P-CSI. In some cases P-CSI reports can also be transmitted along with HARQ ACK/NACK, if P-CSI and HARQ ACK/NACK are jointly coded and mapped.

In some cases, P-CSI prioritization rules may include CSI type first (e.g., within the same cell, types 3/5/6 first followed by types 1/1a/2/2a/2b/2c/4; and across CCs, types 3/5/6/2a first followed by types 2/2b/2c/4 followed by types 1/1a) followed by a tie-breaker. In some examples, the tie-breaker may include CSI process ID first (e.g., lower CSI process may correspond to higher priority), followed by CC index (e.g., lower CC index may correspond to higher priority), followed by subframe set index (e.g., lower P-CSI subframe set index may correspond to higher priority).

CA configurations may develop physical layer specifications for PUCCH on SCells based on the possible mechanisms to enable carrier aggregation of up to 32 CCs for DL and UL communication. For example, some physical layer specifications may include DL control signaling for up to 32 CCs including both self-scheduling and cross-carrier scheduling, and UL control signaling for up to 32 CCs. In some cases, it may be appropriate to support UCI feedback on PUCCH for up to 32 DL carriers, where the UCI signaling format may support UCI feedback for up to 32 DL carriers.

For PUCCH configuration and P-CSI reporting on PUCCH, it may be appropriate use techniques to reduce probability of dropping P-CSI, such as multiplexing of P-CSI reports corresponding to multiple serving cells in a subframe, and multiplexing of P-CSI reports corresponding to multiple serving cells with HARQ ACK/NACK feedback in a subframe. Additionally, UE 115-*a* may dynamically determine the HARQ codebook size and the PUCCH format. In some cases, this may be different from CA HARQ codebook size determination mechanisms based on semi-static configuration of number of CCs in CA in a PUCCH cell group and the DL transmission modes of each CC. Furthermore, it may be appropriate to ensure understanding between base station 105-a and UE 115-a regarding the HARQ codebook and the PUCCH format.

Wireless communications system 200 may support multi-CSI-process, P-CSI configuration, or multi-subframe-set P-CSI configuration. PUCCH format for HARQ feedback may also be subject to dynamic adaptation. In some examples, at least one new PUCCH format may be used for a large number of scheduled CCs, PUCCH format 3 may be used when the number of scheduled CCs is small and PUCCH format 1a/1b/2/2a/2b may be used when the number of scheduled CCs is very small (e.g., only a PCell is scheduled in the primary group, or only a PUCCH enabled SCell is scheduled in the secondary group).

If UE 115-a is configured to provide P-CSI for multiple CCs in a subframe, UE 115-a may be limited to having a single P-CSI report for each CC. In some examples, there may be two or more P-CSI reports due within a CC (e.g., from different CSI processes, different subframe sets, etc.). One P-CSI report may be reported while others may be dropped. In these cases, prioritization rules may apply (e.g., CSI type first, followed by CSI process ID, followed by subframe set index). In other cases, UE 115-a may have more than one P-CSI report for at least one CC. In such cases, UE 115-a may be subject to prioritization rules across the CCs or within the CC, and may be based on the capacity of the PUCCH format in use (e.g., CSI type first, followed by CSI process ID, followed by CC index, followed by subframe set ID).

For example, there may be a case where 3 CCs of similar CSI type may be due in the same subframe: CC1-CSI process ID 1 and subframe set 1, CSI process ID 2, CC2-CSI process 3 and CC3-CSI process ID 1. In such cases, the priority will be: CC1-CSI process ID 1 and subframe set 1, followed by CC3: CSI process ID 1, followed by CC1-CSI process ID 2, followed by CC2-CSI process 3. In some cases it may be appropriate to extend a multi P-CSI report to a multi-CSI process/multi-subframe independent of a multi-CC P-CSI report. Even if UE 115-a is not configured with CA (e.g., a non-CA operation), UE 115-a may be configured to report multi-CSI-process/multi-subframe-set P-CSI.

In response to different uplink control payload combinations (e.g., based on a comparison with a size threshold), different PUCCH formats may be selected. The selection of the possible set of PUCCH formats may be based on a HARQ condition determined by UE 115-a. In some examples, HARQ may be detected for only non-CA scheduling, and non-CA PUCCH formats may be selected (e.g., 1/1a/1b/2/2a/2b). In other examples, HARQ may be detected to have CA scheduling involved (e.g., a physical downlink shared channel (PDSCH) transmission may be detected on a SCell) and CA PUCCH format 3 or PUCCH format 1b, with channel selection, may be selected. Furthermore, if P-CSI can be multiplexed with HARQ ACK/NACK, P-CSI may or may not be used to determine which format to use (e.g., PUCCH format 3 or PUCCH format 2/2a/2b). In systems with up to 32 CCs configured, PUCCH format 3 and PUCCH format 2/2a/2b may carry at most one CC's P-CSI; or one or more new PUCCH formats (e.g., PUCCH format 4 or 5) can carry more than 1 CC's P-CSI. When P-CSI is due in a subframe along with HARQ ACK/NACK, it may also be appropriate to determine if P-CSI should be involved in PUCCH format selection.

In some cases, P-CSI may not be involved in PUCCH format selection. In such cases, UE 115-a may determine a PUCCH format to use based on HARQ ACK/NACK and may determine how to multiplex P-CSI. In other cases, SR may be involved in PUCCH format determination. For example, if HARQ payload is greater than 64 bits, an expanded PUCCH format (e.g., format 5) may be used and multi-CC P-CSI may be multiplexed; if HARQ payload is greater than 21 bits, PUCCH format 4 may be used and multi-CC P-CSI may be multiplexed; if HARQ payload is associated with CA scheduling (e.g., at least one SCC is scheduled), PUCCH format 3 may be used, and at most one CC's P-CSI may be multiplexed; and if a HARQ payload corresponds to a non-CA case, PUCCH format 2/2a/2b may be used to multiplex HARQ and P-CSI bits. In some cases, this may allow for more efficient HARQ operation. In the above example, if SR is present (e.g., to be included in a TTI, to be included in a subframe, etc.), SR may be counted along with HARQ payload against the corresponding thresholds in determining the respective PUCCH format to use.

If P-CSI is involved in PUCCH format selection, UE 115-a may determine a PUCCH format to use based on HARQ ACK/NACK and P-CSI. SR may also be involved in PUCCH format determination. For example, if the collective number of HARQ bits, SR bits and P-CSI bits payload is greater than 64 bits, PUCCH format 5 may be used and multi-CC P-CSI may be multiplexed; if the collective number of HARQ bits, SR bits and P-CSI bits payload is greater than 22 bits, PUCCH format 5 may be used and multi-CC P-CSI may be multiplexed; if HARQ payload is associated with CA scheduling (e.g., at least one SCC is scheduled), PUCCH format 3 may be used and at most one CC's P-CSI may be multiplexed; and if a HARQ payload corresponds to a non-CA case, PUCCH format 2/2a/2b may be used to multiplex HARQ and P-CSI (e.g., if SR is not present). In some cases, this may allow for more efficient P-CSI feedback. Thus, UE 115-a may be configured to support both cases where P-CSI may or may not be involved in PUCCH format selection.

Figure 3:
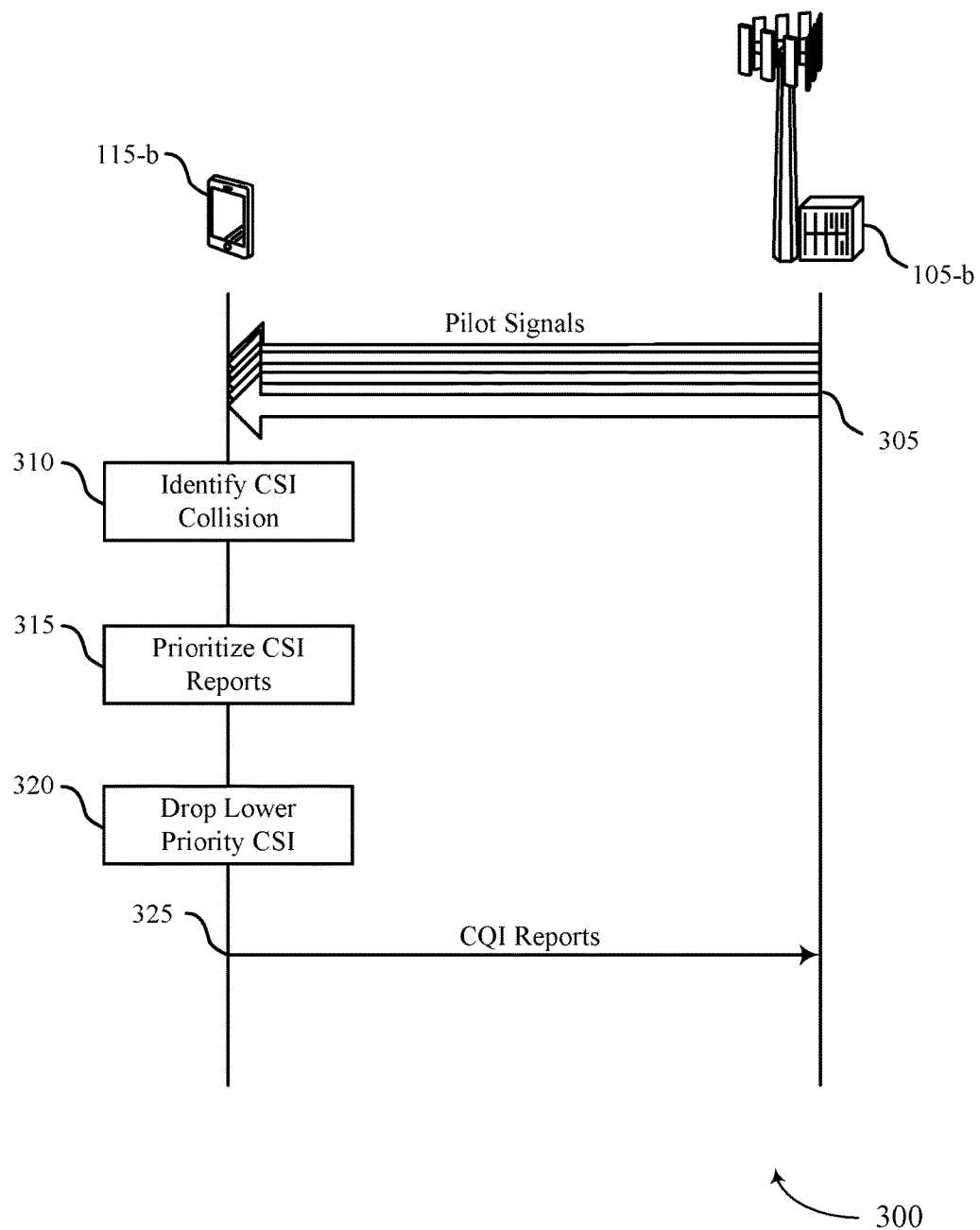
FIG. 3 illustrates an exemplary multi-CSI feedback process that supports aspects of P-CSI reporting for eCA in accordance with various aspects of the present disclosure.

FIG. 3 illustrates an example of a multi-CSI feedback process 300 for P-CSI reporting for eCA in accordance with various aspects of the present disclosure. The multi-CSI feedback process 300 may include a UE 115-b and base station (BS) 105-b, which may be examples of a UE 115 and base station 105 described with reference to FIGS. 1-2.

Multi-CSI feedback process 300 may illustrate aspects of implementing a multi-CSI feedback process in a wireless communication system between base station 105-b and UE 115-b. The method of wireless communication may include receiving a configuration supporting transmission of multiple P-CSI reports during a TTI (e.g., a subframe). The P-CSI reports may be associated with two or more P-CSI reports for multiple subframe sets of a CSI process, P-CSI reports for multiple CSI processes of a CC, or P-CSI reports for multiple CCs of a CA configuration.

At 305, base station 105-b may transmit a number of pilot signals to UE 115-b for channel estimation. In some examples base station 105-b may also send configuration information to UE 115-b. The configuration may support transmission of the multiple P-CSI reports, and may include at least one of a CoMP configuration, a CA configuration with one or more PUCCH groups, a dual-connectivity configuration or an IMTA configuration. In some cases, the CA configuration may include a configuration of more than five CCs.

At 310, UE 115-*b* may determine two or more P-CSI reports due for transmission during a TTI. At 315 UE 115-*b* may prioritize the P-CSI reports according to a prioritization rule. The prioritization rule may be based on a payload capacity or payload sizes of the two or more P-CSI reports. In some cases, the payload capacity may be based on a PUCCH format. For example, the prioritization rules may include CSI type first, followed by a CSI process ID, followed by a CC index, followed by a subframe set index. In various examples, prioritization may be performed within a CC, or across CCs, or a combination thereof.

At 320 UE 115-*b* may drop one or more non-prioritized P-CSI reports and at 325, UE 115-*b* may transmit (e.g., in an uplink control message) at least one of the P-CSI reports during the TTI according to the prioritization rule.

Figure 4:
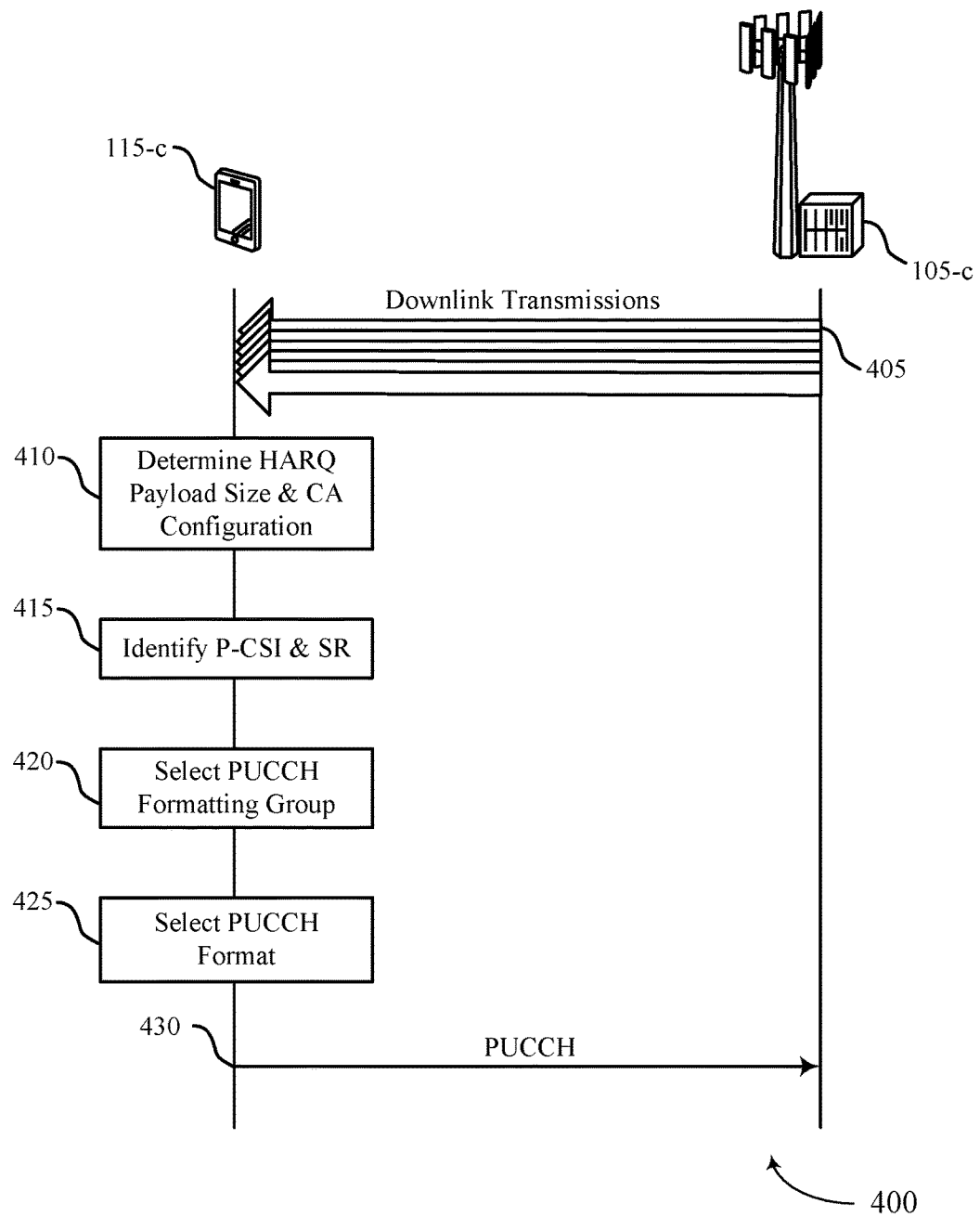
FIG. 4 illustrates an exemplary process flow that supports aspects of P-CSI reporting for eCA in accordance with various aspects of the present disclosure.

FIG. 4 illustrates an example of a process flow 400 for P-CSI reporting for eCA in accordance with various aspects of the present disclosure. Process flow 400 may include a UE 115-*c* and base station 105-*c*, which may be examples of a UE 115 and base station 105 described with reference to FIGS. 1-3. Process flow 400 may illustrate signaling and operations for determining which PUCCH format to use in a wireless communication system between base station 105-*c* and 115-*c*. Changes, adaptations and modifications may be made without departing from the scope of the disclosure.

At 405, base station 105-*c* may transmit one or more DL signals to UE 115-*c*. The DL signals may be associated with one or more CCs and with one or more HARQ processes. Base station 105-*c* may transmit one or more pilot signals to UE 115-*c* for channel estimation. Thus, UE 115-*c* may identify uplink control information such as HARQ feedback and CSI based on the one or more DL signals.

At 410, UE 115-*c* may determine the size of a HARQ payload or the overall uplink control information payload for the configured CCs, and a CA configuration. In some cases, UE 115-*c* may receive signaling indicative of the size of the HARQ payload from base station 105-*c*.

At 415, UE 115-*c* may identify that at least one of a SR or a P-CSI report is present (e.g., to be included in a TTI, to be included in a subframe, available for transmission with the HARQ feedback in the subframe, etc.) for an uplink control message. In some examples, UE 115-*c* may be configured to multiplex the HARQ payload with P-CSI reports for two or more CCs configured for the UE 115-*c*, where UE 115-*c* may identify that at least one of an SR or a P-CSI report is present by identifying the P-CSI reports for the two or more CCs configured for the UE 115-*c*. UE 115-*c* may also identify that at least one of an SR or a P-CSI report is present by determining whether a P-CSI report type or a subset of P-CSI report types of a set of P-CSI report types is present. In some examples, the set of P-CSI report types may at least include P-CSI report types that support RI feedback or wideband PMI feedback. The uplink control message may be associated with a cell group among multiple cell groups.

At 420, UE 115-*c* may select a PUCCH format group which may, for example, be a first set of PUCCH formats associated with reporting HARQ feedback for one CC, a second set of PUCCH formats associated with reporting HARQ feedback for up to five CCs, or a third set of PUCCH formats associated with reporting HARQ feedback for more than five CCs. The PUCCH format group may be selected based on a number of CCs in the multiple scheduled CCs. UE 115-*c* may also determine whether a size of the payload for the at least one of the SR or P-CSI report is included in the size of the uplink control message for the comparison with the threshold based on the selected PUCCH format group (e.g., a set of PUCCH formats).

At 425, UE 115-*c* may select a PUCCH format from a PUCCH format group based on a comparison of a size of an uplink control message with a threshold, where the uplink control message may include the HARQ payload and a payload for at least one of the SR or the P-CSI report. UE 115-*c* may select a PUCCH format having a greater capacity than another PUCCH format based on the size of the uplink control message exceeding the threshold. In some cases, the PUCCH format may be selected based on a scaled P-CSI report payload size. UE 115-*c* may receive signaling (e.g., RRC signaling) indicative of whether to consider a presence of the at least one of the SR or the P-CSI report, or both, in selecting the PUCCH format. In some examples the UE 115-*c* may receive signaling (e.g., RRC signaling) indicative of the threshold, such as a communication resource capacity associated with a PUCCH format (e.g., one or more bit capacities associated with the PUCCH format, a bit capacity in combination with a coding rate or coding factor, etc.).

At 430, UE 115-*c* may then transmit the uplink control message (e.g., in the TTI, in the subframe, etc.) using the selected PUCCH format. In some cases, the uplink control message may include the HARQ payload and the SR payload; or the HARQ payload, the SR payload and the P-CSI payload.

Figure 5:
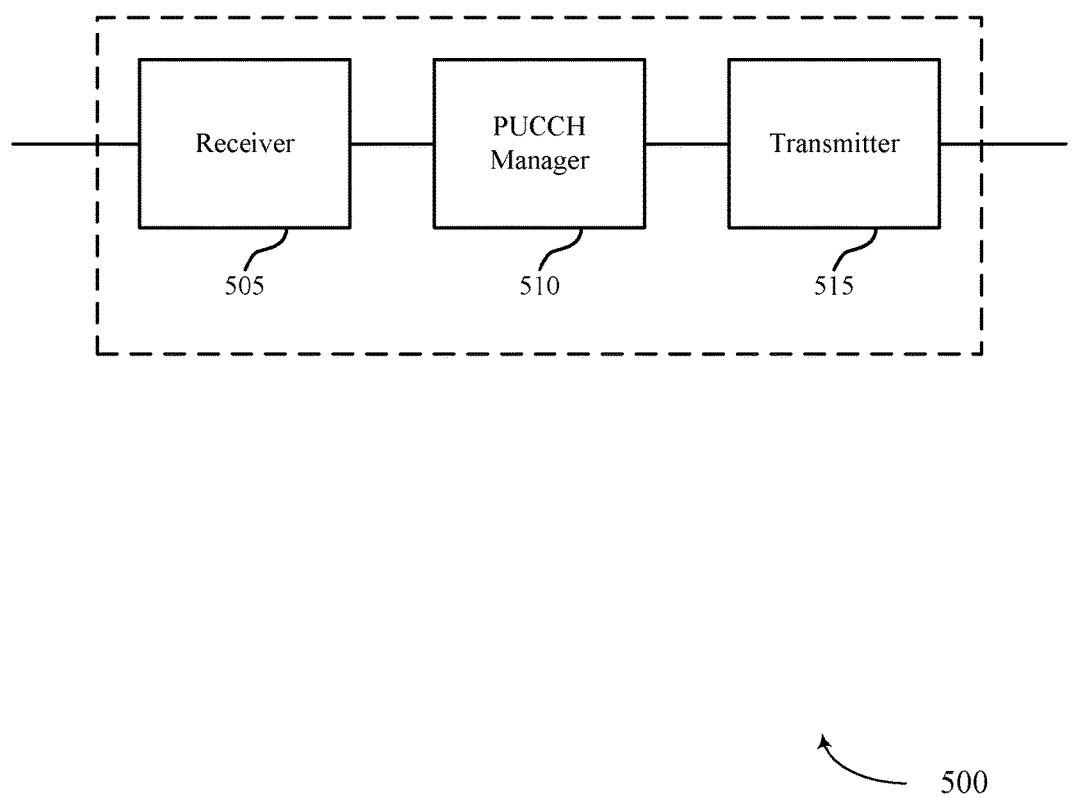
FIGS. 5-7 show block diagrams of a wireless device that supports aspects of P-CSI reporting for eCA in accordance with various aspects of the present disclosure.

FIG. 5 shows a block diagram of a wireless device 500 that supports P-CSI reporting for eCA in accordance with various aspects of the present disclosure. Wireless device 500 may be an example of aspects of a UE 115 described with reference to FIGS. 1-4. Wireless device 500 may include a receiver 505, a PUCCH manager 510, or a transmitter 515. Wireless device 500 may also include a processor. Each of these components may be in communication with one another.

The receiver 505 may receive information such as packets, user data, or control information associated with various information channels (e.g., control channels, data channels, and information related to P-CSI reporting for eCA, etc.). Information may be passed on to the PUCCH manager 510, and to other components of wireless device 500. In some examples, the receiver 505 may receive signaling indicative of the size of the HARQ payload from a base station. In some examples, the receiver 505 may receive signaling indicative of whether consider a presence of the at least one of the SR or the P-CSI report in the selection of the PUCCH format. In some examples, the signaling includes RRC signaling.

The PUCCH manager 510 may detect a size of a HARQ payload for reporting (e.g., in a TTI, in a subframe, etc.) HARQ feedback associated with multiple scheduled CCs, determine that at least one of a SR or a periodic channel state information (P-CSI) report is present, select a PUCCH format from a set of PUCCH formats based on a comparison of a size of an uplink control message with a threshold, where the uplink control message includes the HARQ payload and a payload for at least one of the SR or the P-CSI report, and transmit (e.g. in cooperation with the transmitter 515) the uplink control message (e.g., in the TTI, in the subframe, etc.) using the selected PUCCH format.

The transmitter 515 may transmit signals received from other components of wireless device 500. In some examples, the transmitter 515 may be collocated with the receiver 505 in a transceiver module. The transmitter 515 may include a single antenna, or it may include multiple antennas. In some examples, the transmitter 515 may transmit the uplink control message using the selected PUCCH format.

Figure 6:
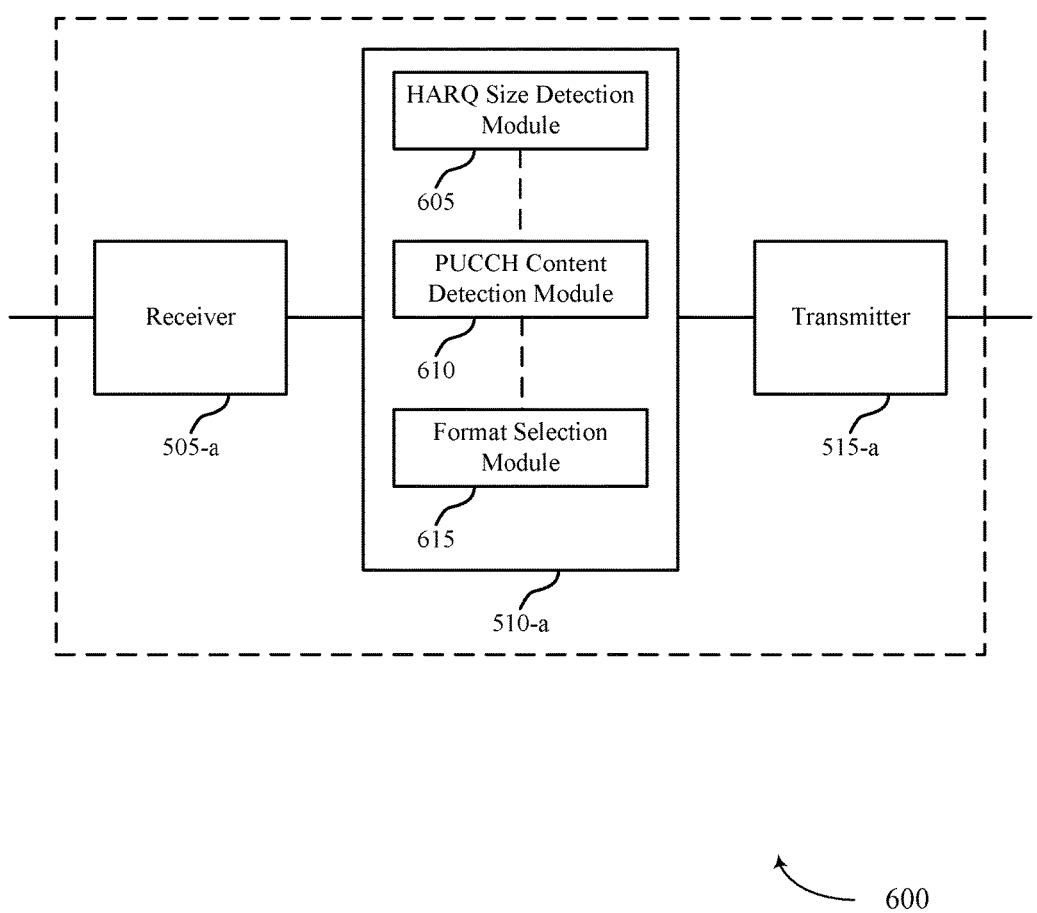

FIG. 6 shows a block diagram of a wireless device 600 that supports P-CSI reporting for eCA in accordance with various aspects of the present disclosure. Wireless device 600 may be an example of aspects of a wireless device 500 or a UE 115 described with reference to FIGS. 1-5. Wireless device 600 may include a receiver 505-a, a PUCCH manager 510-a, or a transmitter 515-a. Wireless device 600 may also include a processor. Each of these components may be in communication with one another. The PUCCH manager 510-a may also include a HARQ size detection module 605, a PUCCH content detection module 610, and a format selection module 615.

The receiver 505-a may receive information which may be passed on to PUCCH manager 510-a, and to other components of wireless device 600. The PUCCH manager 510-a may perform the operations described with reference to FIG. 5. The transmitter 515-a may transmit signals received from other components of wireless device 600.

The HARQ size detection module 605 may detect a size of a HARQ payload for reporting (e.g., in a TTI, in a subframe, etc.) HARQ feedback associated with multiple scheduled CCs as described with reference to FIGS. 2-4. The PUCCH content detection module 610 may determine that at least one of a SR or a periodic channel state information (P-CSI) report is present (e.g., to be included in the TTI, to be included in the subframe, etc.) as described with reference to FIGS. 2-4. In some examples, determining that at least one of the SR or the P-CSI report may be present includes determining whether a P-CSI report type of a set of P-CSI report types may be present. In some examples, the set of P-CSI report types at least includes P-CSI report types that support rank indicator (RI) feedback or wideband PMI feedback.

The format selection module 615 may select a PUCCH format from a set of PUCCH formats based on a comparison of a size of an uplink control message with a threshold. The uplink control message may, for instance, include the HARQ payload and a payload for the SR or the P-CSI report, or both, as described with reference to FIGS. 2-4. In some examples, the set of PUCCH formats includes a first set of PUCCH formats associated with one CC, a second set of PUCCH formats associated with up to five CCs, or a third set of PUCCH formats associated with more than five CCs. The format selection module 615 may select the set of PUCCH formats based on a number of CCs in the multiple scheduled CCs. The format selection module 615 may also determine whether to base the PUCCH format selection on the presences of the SR or the P-CSI report, depending upon which set of PUCCH formats is selected.

In some examples, selecting the PUCCH format includes selecting the third set of PUCCH formats (e.g., PUCCH formats associated with and that support UCI for more than five CCs). The third set of PUCCH formats may be selected based on the size of the uplink control message exceeding the threshold, for instance. In some examples, the uplink control message includes the HARQ payload and the SR payload. In some examples, the uplink control message includes the HARQ payload, the SR payload, and the P-CSI payload. Additionally or alternatively, the PUCCH format may be selected based on a scaled P-CSI report payload size. In some examples, the uplink control message may be associated with a cell group among multiple cell groups.

Figure 7:
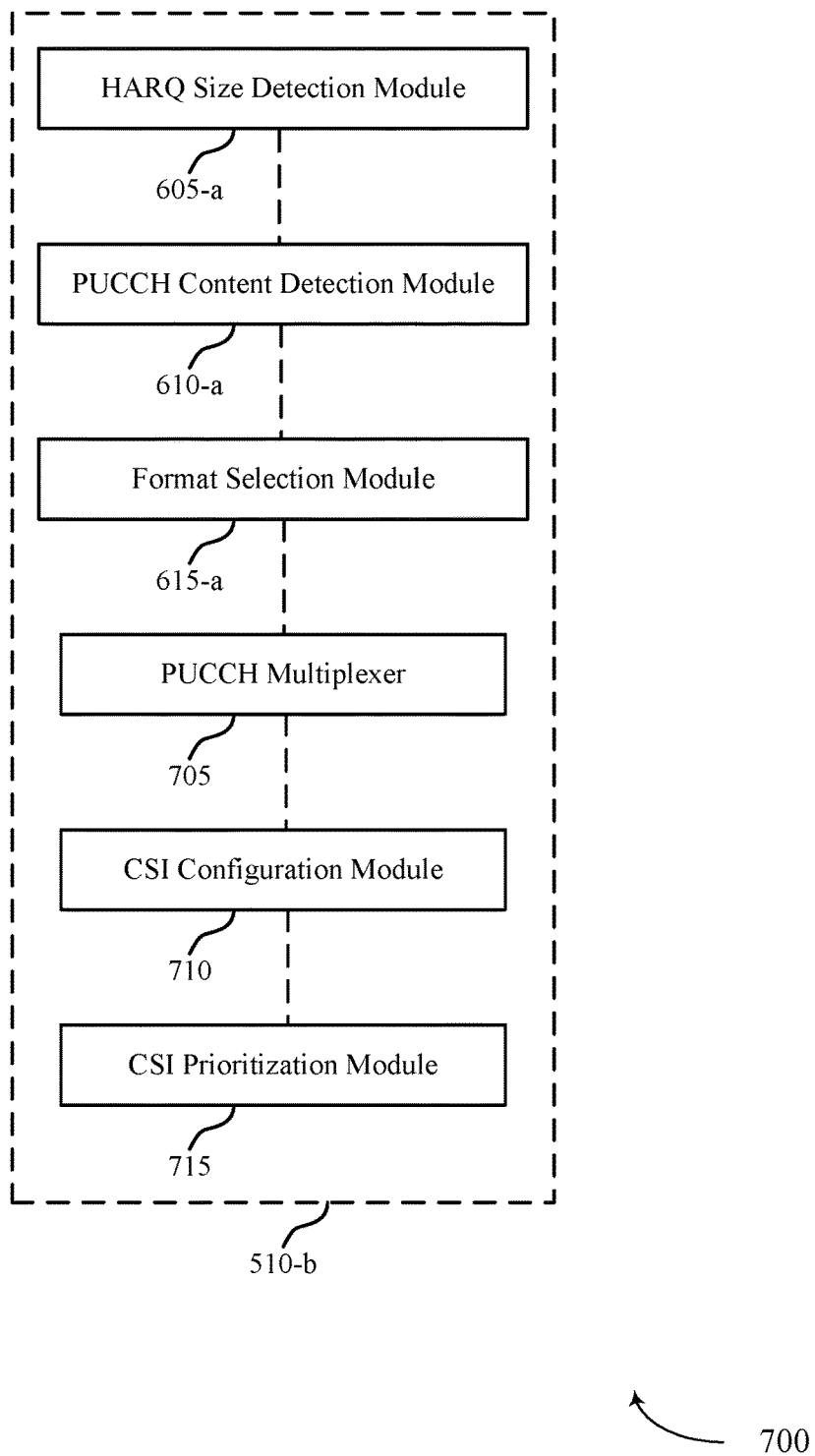

FIG. 7 shows a block diagram 700 of a PUCCH manager 510-b that supports P-CSI reporting for eCA in accordance with various aspects of the present disclosure. The PUCCH manager 510-b may be an example of aspects of a PUCCH manager 510 described with reference to FIGS. 5-6, and may be a component of a UE 115, a wireless device 500, or a wireless device 600 as described with reference to FIGS. 1-6. The PUCCH manager 510-b may include a HARQ size detection module 605-a, a PUCCH content detection module 610-a, and a format selection module 615-a. Each of these modules may perform the functions described with reference to FIG. 6. The PUCCH manager 510-b may also include a PUCCH multiplexer 705, a CSI configuration module 710, and a CSI prioritization module 715.

The PUCCH multiplexer 705 may multiplex a HARQ payload with P-CSI reports for two or more CCs configured for a UE, where a determining that at least one of an SR or a P-CSI report is present (e.g., to be included in an uplink control message) includes identifying P-CSI reports for the two or more CCs configured for the UE, as described with reference to FIGS. 2-4.

The CSI configuration module 710 may receive (e.g., in cooperation with a receiver) a configuration supporting transmission of multiple P-CSI reports during a TTI (e.g., a subframe), and the multiple P-CSI reports may be associated with two or more of P-CSI reports for multiple subframe sets of a CSI process, P-CSI reports for multiple CSI processes of a CC, or P-CSI reports for multiple CCs of a CA configuration as described with reference to FIGS. 2-4. In some examples, the configuration supporting transmission of the multiple P-CSI reports includes a CoMP configuration, a CA configuration with one or more PUCCH groups, a dual-connectivity configuration, or an IMTA configuration. In some examples, the CA configuration includes a configuration of more than five CCs (e.g., an eCA configuration).

The CSI prioritization module 715 may determine that two or more P-CSI reports are due for transmission during a TTI as described with reference to FIGS. 2-4. The CSI prioritization module 715 may transmit (e.g., in cooperation with a transmitter) at least one of the P-CSI reports during the TTI according to a prioritization rule. In some examples, the prioritization rule may be performed based on a payload capacity or payload sizes of the two or more P-CSI reports. In some examples, the payload capacity may be based on a PUCCH format. In some examples, the prioritization rule includes prioritizing a CSI type, followed by a CSI process ID, followed by a CC index, followed by a subframe set index. The prioritization may be performed within a CC, across CCs, or a combination thereof.

Figure 8:
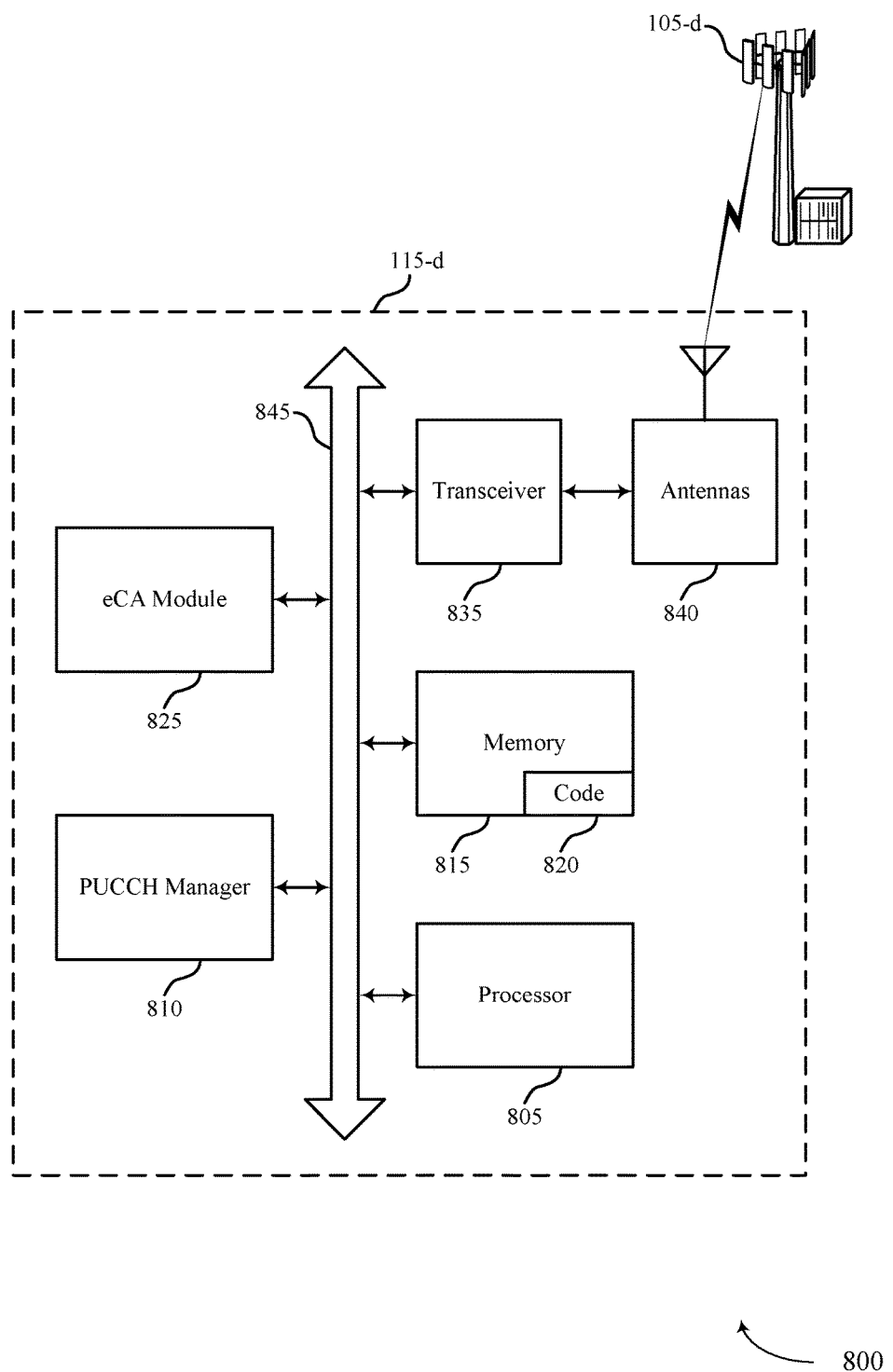
FIG. 8 illustrates a block diagram of a system, including a user equipment (UE), that supports aspects of P-CSI reporting for eCA in accordance with various aspects of the present disclosure.

FIG. 8 shows a diagram of a system 800, including a UE 115-d, that supports P-CSI reporting in eCA in accordance with various aspects of the present disclosure. UE 115-d may be an example of a wireless device 500, a wireless device 600, or a UE 115 described with reference to FIGS. 1-7. UE 115-d may include a PUCCH manager 810, which may be an example of a PUCCH manager 510 described with reference to FIGS. 5-7. UE 115-d may also include an eCA module 825, which may enable eCA operations as described with reference to FIG. 1, such as operations involving a large number of CCs. UE 115-d may also include components for bi-directional voice and data communications including components for transmitting communications and components for receiving communications. For example, UE 115-d may communicate bi-directionally with base station 105-d.

UE 115-d may also include a processor 805, and memory 815 (including software/firmware code 820), a transceiver 835, and one or more antenna(s) 840, each of which may communicate, directly or indirectly, with one another (e.g., via buses 845). The transceiver 835 may communicate bi-directionally, via the antenna(s) 840 or wired or wireless links, with one or more networks, as described above. For example, the transceiver 835 may communicate bi-directionally with a base station 105-*d*. The transceiver 835 may include a modem to modulate the packets and provide the modulated packets to the antenna(s) 840 for transmission, and to demodulate packets received from the antenna(s) 840. While UE 115-*d* may include a single antenna 840, UE 115-*d* may also have multiple antennas 840 capable of concurrently transmitting or receiving multiple wireless transmissions.

The memory 815 may include random access memory (RAM) and read only memory (ROM). The memory 815 may store computer-readable, computer-executable software/firmware code 820 including instructions that, when executed, cause the processor 805 to perform various functions described herein (e.g., P-CSI reporting for eCA, etc.). Alternatively, the software/firmware code 820 may not be directly executable by the processor 805 but cause a computer (e.g., when compiled and executed) to perform functions described herein. The processor 805 may include an intelligent hardware device, (e.g., a central processing unit (CPU), a microcontroller, an application specific integrated circuit (ASIC), etc.)

The components of wireless device 500, wireless device 600, PUCCH manager 510, and system 800 may, individually or collectively, be implemented with at least one ASIC adapted to perform some or all of the applicable functions in hardware. Alternatively, the functions may be performed by one or more other processing units (or cores), on at least one integrated circuit (IC). In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 9:
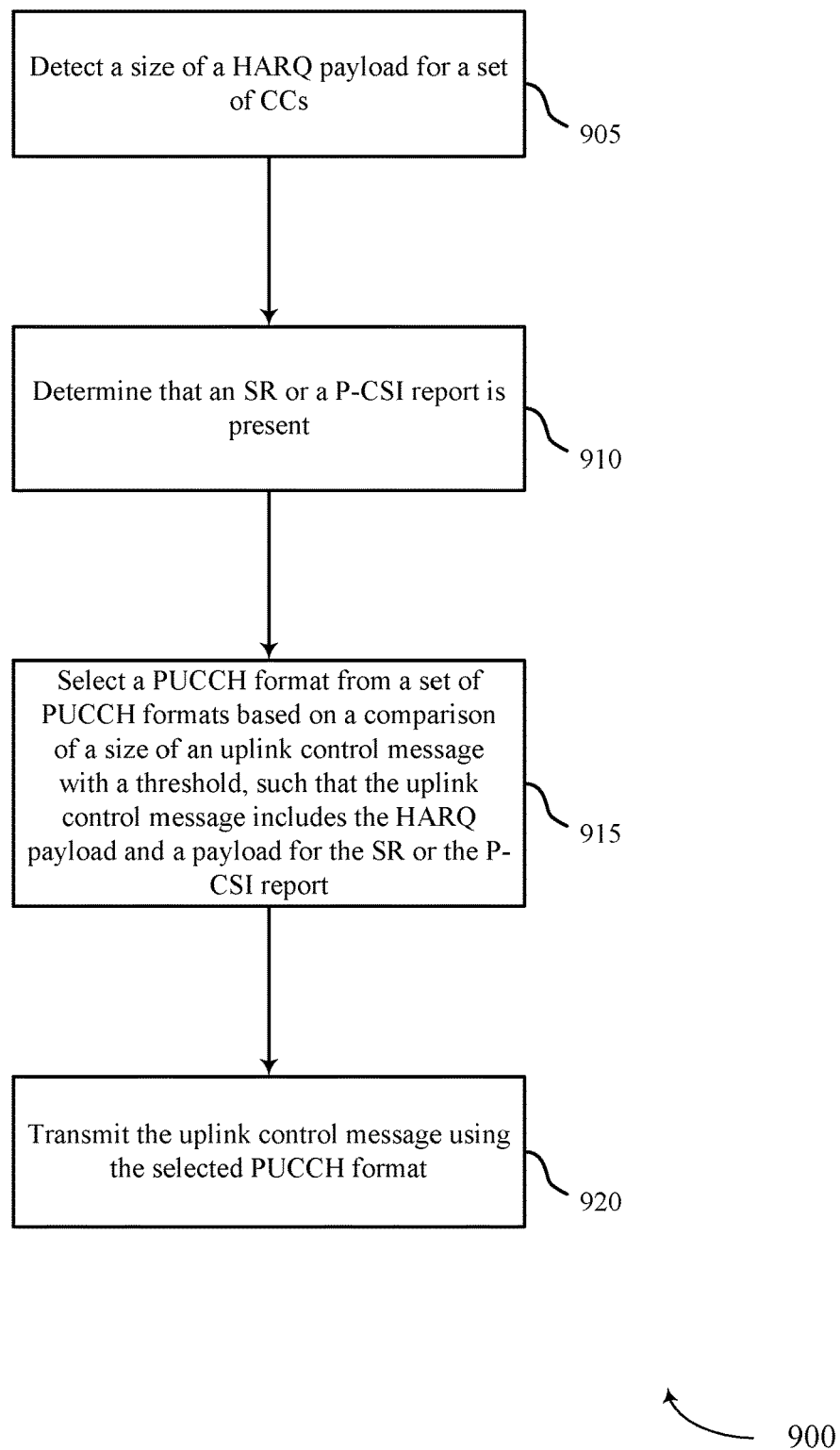
FIGS. 9-13 illustrate methods for P-CSI reporting for eCA in accordance with various aspects of the present disclosure.

FIG. 9 shows a flowchart illustrating a method 900 for P-CSI reporting for eCA in accordance with various aspects of the present disclosure. The operations of method 900 may be implemented by a UE 115, a wireless device 500, or a wireless device 600, or their components, as described with reference to FIGS. 1-8. For example, the operations of method 900 may be performed by the PUCCH manager 510 as described with reference to FIGS. 5-8. In some examples, a UE 115 may execute a set of instructions to control the functional elements of the UE 115 to perform the functions described below. Additionally or alternatively, the UE 115 may perform aspects the functions described below using special-purpose hardware.

At block 905, the UE 115 may detect a size of a HARQ payload for reporting (e.g., in a TTI, in a subframe, etc.) HARQ feedback associated with transmissions on a set of CCs, as described with reference to FIGS. 2-4. In some examples, operations of block 905 may be performed by a HARQ size detection module 605 as described with reference to FIG. 6 or 7.

At block 910, the UE 115 may determine that at least one of a SR or a periodic channel state information (P-CSI) report is present (e.g., to be included in the TTI, to be included in the subframe, etc.), as described with reference to FIGS. 2-4. In some cases, determining that the SR or the P-CSI report is present includes determining to report a subset of P-CSI reports from a set of P-CSI reports. In some examples, operations of block 910 may be performed by a PUCCH content detection module 610 as described with reference to FIG. 6 or 7.

At block 915, the UE 115 may select a PUCCH format from a set of PUCCH formats based at least in part on a comparison of a size of an uplink control message with a threshold, where the uplink control message includes the HARQ payload and a payload for at least one of the SR or the P-CSI report, as described with reference to FIGS. 2-4. In some examples, operations of block 915 may be performed by a format selection module 615 as described with reference to FIG. 6 or 7.

At block 920, the UE 115 may transmit the uplink control message (e.g., in the TTI, in the subframe, etc.) using the selected PUCCH format, as described with reference to FIGS. 2-4. In some examples, operations of block 920 may be performed by a transmitter 515 as described with reference to FIGS. 5-6, or a transceiver 835 described with reference to FIG. 8.

Figure 10:
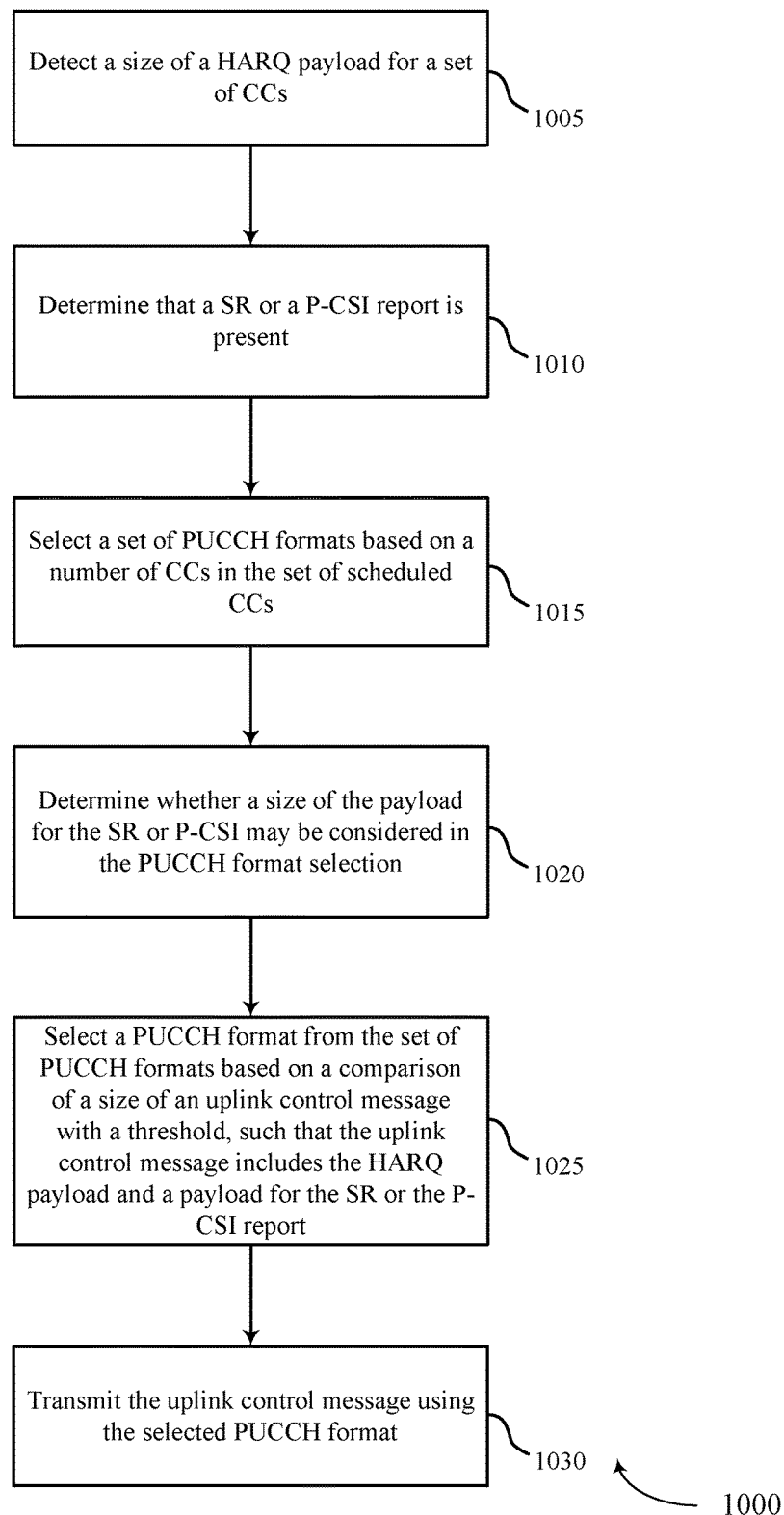

FIG. 10 shows a flowchart illustrating a method 1000 for P-CSI reporting in eCA in accordance with various aspects of the present disclosure. The operations of method 1000 may be implemented by a UE 115, a wireless device 500, or a wireless device 600, or their components, as described with reference to FIGS. 1-8. For example, the operations of method 1000 may be performed by the PUCCH manager 510 as described with reference to FIGS. 5-8. In some examples, a UE 115 may execute a set of instructions to control the functional elements of the UE 115 to perform the functions described below. Additionally or alternatively, the UE 115 may perform aspects the functions described below using special-purpose hardware. The method 1000 may also incorporate aspects of method 900 described with reference to FIG. 9.

At block 1005, the UE 115 may detect a size of a HARQ payload for reporting (e.g., in a TTI, in a subframe, etc.) HARQ feedback associated with transmissions on a set of CCs, as described with reference to FIGS. 2-4. In some examples, operations of block 1005 may be performed by a HARQ size detection module 605 as described with reference to FIG. 6 or 7.

At block 1010, the UE 115 may determine that at least one of a SR or a periodic channel state information (P-CSI) report is present (e.g., to be included in the TTI, to be included in the subframe, etc.), as described with reference to FIGS. 2-4. In some examples, operations of block 1010 may be performed by a PUCCH content detection module 610 as described with reference to FIG. 6 or 7.

At block 1015, the UE 115 may select a set of PUCCH formats based at least in part on a number of CCs in the multiple scheduled CCs, as described with reference to FIGS. 2-4. In some examples, operations of block 1015 may be performed by a format selection module 615 as described with reference to FIG. 6 or 7.

At block 1020, the UE 115 may determine whether a size of the payload for the at least one of the SR or P-CSI report is included in the size of the uplink control message for the comparison with the threshold based at least in part on the selected set of PUCCH formats, as described with reference to FIGS. 2-4. In some examples, operations of block 1020 may be performed by a format selection module 615 as described with reference to FIG. 6 or 7.

At block 1025, the UE 115 may select a PUCCH format from the set of PUCCH formats based at least in part on a comparison of a size of an uplink control message with a threshold, where the uplink control message includes the HARQ payload and a payload for at least one of the SR or the P-CSI report, as described with reference to FIGS. 2-4. In some cases, selecting the PUCCH format includes selecting a PUCCH format from a set of PUCCH formats associated with reporting HARQ feedback for more than 5 CCs based at least in part on the size of the uplink control message exceeding the threshold. In some examples, operations of block 1025 may be performed by a format selection module 615 as described with reference to FIG. 6 or 7.

At block 1030, the UE 115 may transmit the uplink control message (e.g., in the TTI, in the subframe, etc.) using the selected PUCCH format, as described with reference to FIGS. 2-4. In some examples, operations of block 1030 may be performed by a transmitter 515 as described with reference to FIG. 5-6, or a transceiver 835 as described with reference to FIG. 8.

Figure 11:
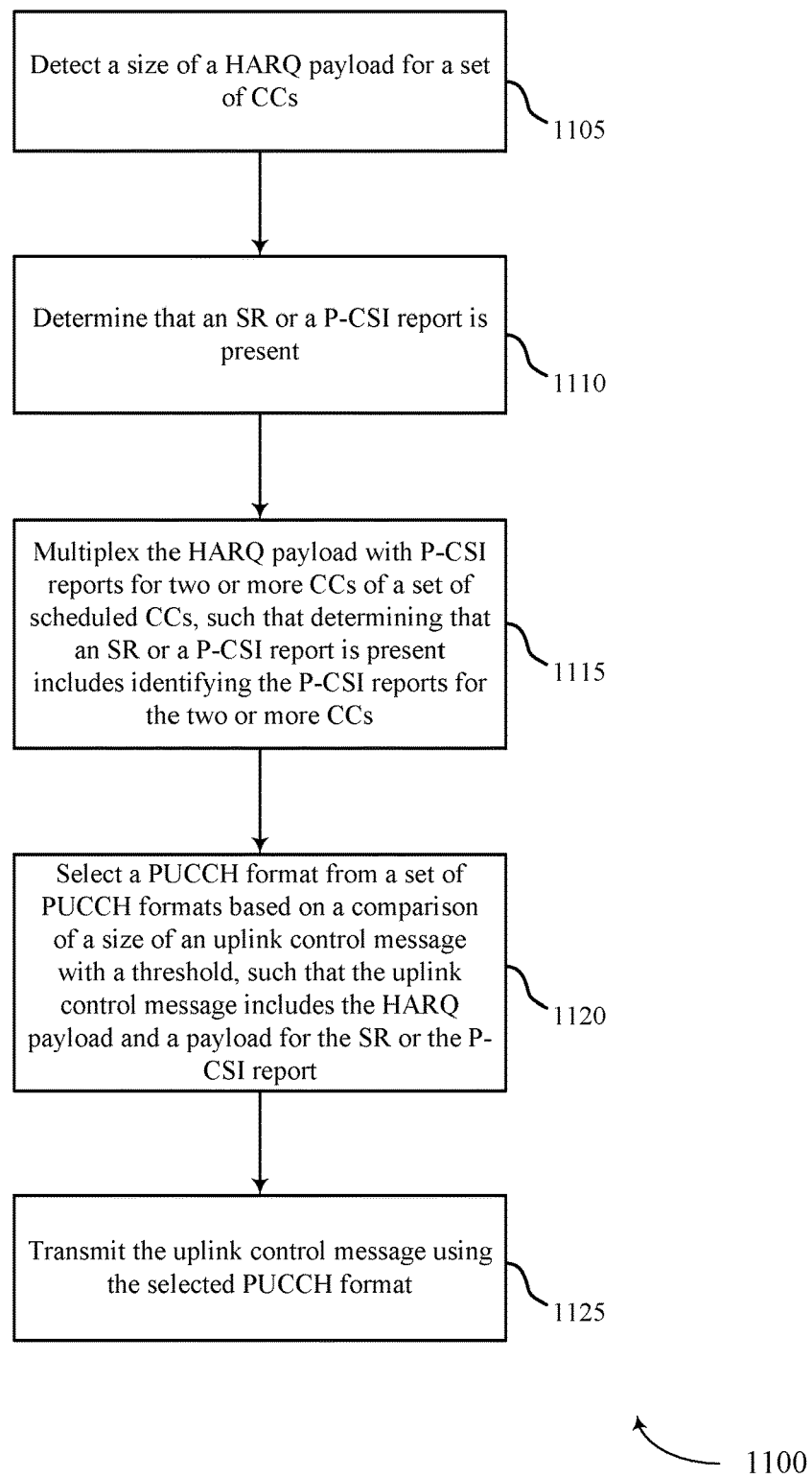

FIG. 11 shows a flowchart illustrating a method 1100 for P-CSI reporting in eCA in accordance with various aspects of the present disclosure. The operations of method 1100 may be implemented by a UE 115, a wireless device 500, or a wireless device 600, or their components, as described with reference to FIGS. 1-8. For example, the operations of method 1100 may be performed by the PUCCH manager 510 as described with reference to FIGS. 5-8. In some examples, a UE 115 may execute a set of instructions to control the functional elements of the UE 115 to perform the functions described below. Additionally or alternatively, the UE 115 may perform aspects the functions described below using special-purpose hardware. The method 1100 may also incorporate aspects of methods 900, and 1000 described with reference to FIGS. 9-10.

At block 1105, the UE 115 may detect a size of a HARQ payload for reporting (e.g., in a TTI, in a subframe, etc.) HARQ feedback associated with transmissions on a set of CCs, as described with reference to FIGS. 2-4. In some examples, operations of block 1105 may be performed by a HARQ size detection module 605 as described with reference to FIG. 6 or 7.

At block 1110, the UE 115 may determine that at least one of a SR or a periodic channel state information (P-CSI) report is present (e.g., to be included in the TTI, to be included in the subframe, etc.), as described with reference to FIGS. 2-4. In some examples, operations of block 1110 may be performed by a PUCCH content detection module 610 as described with reference to FIG. 6 or 7.

At block 1115, the UE 115 may multiplex the HARQ payload with P-CSI reports for two or more CCs configured for the UE 115, where determining that at least one of an SR or a P-CSI report is present includes identifying the P-CSI reports for the two or more CCs configured for the UE 115, as described with reference to FIGS. 2-4. In some examples, operations of block 1125 may be performed by a PUCCH multiplexer 705 as described with reference to FIG. 7.

At block 1120, the UE 115 may select a PUCCH format from a set of PUCCH formats based at least in part on a comparison of a size of an uplink control message with a threshold, where the uplink control message includes the HARQ payload and a payload for at least one of the SR or the P-CSI report, as described with reference to FIGS. 2-4. In some examples, operations of block 1115 may be performed by a format selection module 615 as described with reference to FIG. 6 or 7.

At block 1125, the UE 115 may transmit (e.g., in the TTI, in the subframe, etc.) the uplink control message using the selected PUCCH format as described with reference to FIGS. 2-4. In some examples, operations of block 1120 may be performed by transmitter 515 as described with reference to FIGS. 5-6, or a transceiver 835 as described with reference to FIG. 8.

Figure 12:
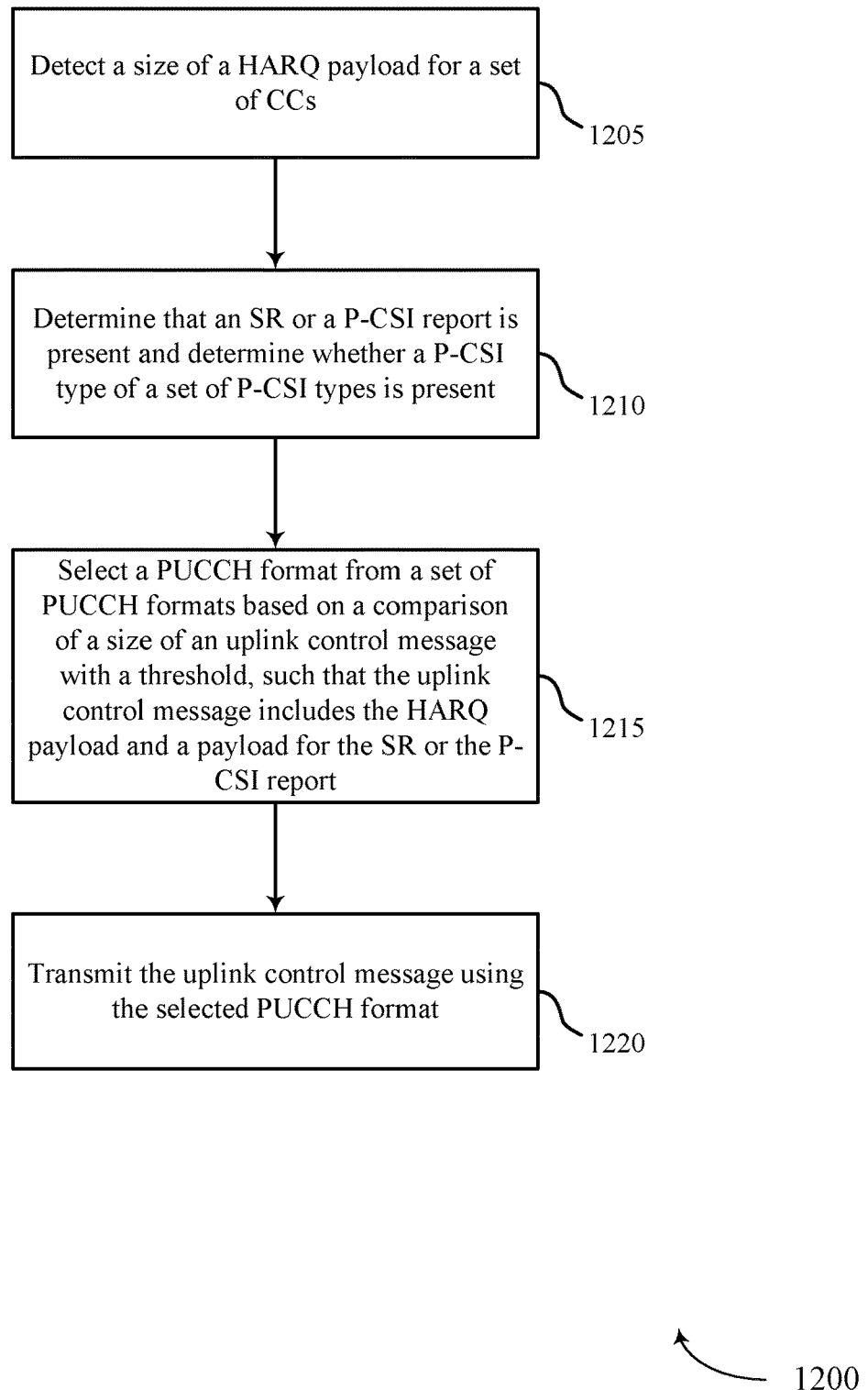

FIG. 12 shows a flowchart illustrating a method 1200 for P-CSI reporting in eCA in accordance with various aspects of the present disclosure. The operations of method 1200 may be implemented by a UE 115, a wireless device 500, or a wireless device 600, or their components, as described with reference to FIGS. 1-8. For example, the operations of method 1200 may be performed by the PUCCH manager 510 as described with reference to FIGS. 5-8. In some examples, a UE 115 may execute a set of instructions to control the functional elements of the UE 115 to perform the functions described below. Additionally or alternatively, the UE 115 may perform aspects the functions described below using special-purpose hardware. The method 1200 may also incorporate aspects of methods 900, 1000, and 1100 described with reference to FIGS. 9-11.

At block 1205, the UE 115 may detect a size of a HARQ payload for reporting (e.g., in a TTI, in a subframe, etc.) HARQ feedback associated with transmission on multiple scheduled CCs as described with reference to FIGS. 2-4. In some examples, operations of block 1205 may be performed by a HARQ size detection module 605 as described with reference to FIG. 6 or 7.

At block 1210, the UE 115 may determine that at least one of a SR or a periodic channel state information (P-CSI) report is present (e.g., to be included in the TTI, to be included in the subframe, etc.) as described with reference to FIGS. 2-4. In some examples, operations of block 1210 may be performed by a PUCCH content detection module 610 as described with reference to FIG. 6 or 7.

At block 1215, the UE 115 may select a PUCCH format from a set of PUCCH formats based at least in part on a comparison of a size of an uplink control message with a threshold, where the uplink control message includes the HARQ payload and a payload for at least one of the SR or the P-CSI report as described with reference to FIGS. 2-4. In some examples, operations of block 1215 may be performed by a format selection module 615 as described with reference to FIG. 6 or 7.

At block 1220, the UE 115 may transmit the uplink control message (e.g., in the TTI, in the subframe, etc.) using the selected PUCCH format as described with reference to FIGS. 2-4. In some examples, operations of block 1220 may be performed by a transmitter 515 as described with reference to FIGS. 5-6, or a transceiver 835 as described with reference to FIG. 8.

Figure 13:
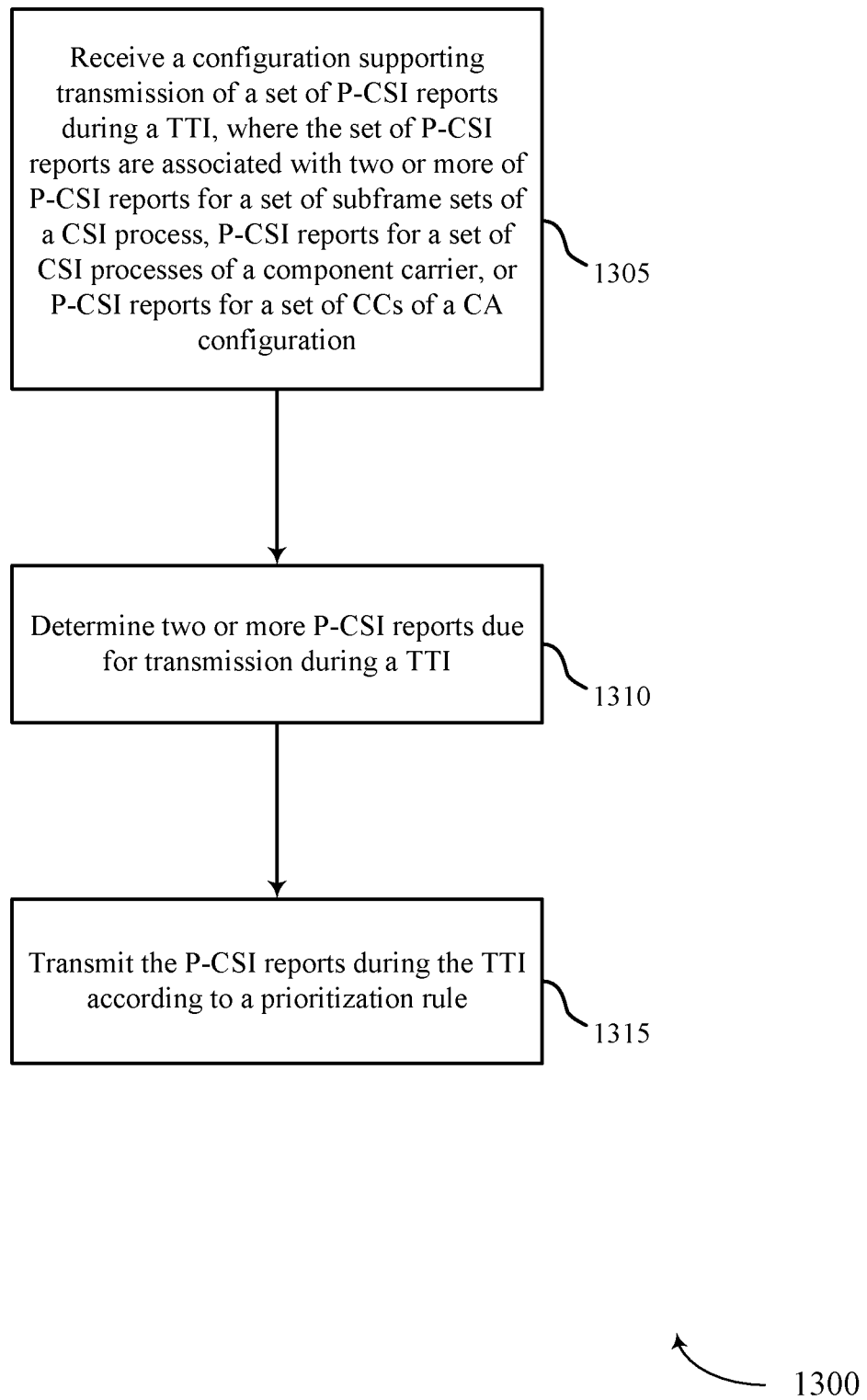

FIG. 13 shows a flowchart illustrating a method 1300 for P-CSI reporting in eCA in accordance with various aspects of the present disclosure. The operations of method 1300 may be implemented by a UE 115, a wireless device 500, or a wireless device 600, or their components, as described with reference to FIGS. 1-8. For example, the operations of method 1300 may be performed by the PUCCH manager 510 as described with reference to FIGS. 5-8. In some examples, a UE 115 may execute a set of instructions to control the functional elements of the UE 115 to perform the functions described below. Additionally or alternatively, the UE 115 may perform aspects the functions described below using special-purpose hardware. The method 1300 may also incorporate aspects of methods 900, 1000, 1100, and 1200 described with reference to FIGS. 9-12.

At block 1305, the UE 115 may receive a configuration supporting transmission of multiple periodic channel state information (P-CSI) reports during a TTI, where the multiple P-CSI reports are associated with two or more of P-CSI reports for multiple subframe sets of a CSI process, P-CSI reports for multiple CSI processes of a CC, or P-CSI reports for multiple CCs of a CA configuration as described with reference to FIGS. 2-4. In some examples, operations of block 1305 may be performed by a CSI configuration module 710 as described with reference to FIG. 7.

At block 1310, the UE 115 may determine two or more P-CSI reports due for transmission during a TTI as described with reference to FIGS. 2-4. In some examples, operations of block 1310 may be performed by a CSI prioritization module 715 as described with reference to FIG. 7.

At block 1315, the UE 115 may transmit at least one of the P-CSI reports during the TTI according to a prioritization rule as described with reference to FIGS. 2-4. In some examples, operations of block 1315 may be performed by a CSI prioritization module 715 as described with reference to FIG. 7.

Thus, methods 900, 1000, 1100, 1200, and 1300 may provide for P-CSI reporting in eCA. It should be noted that methods 900, 1000, 1100, 1200, and 1300 describe possible implementation, and that the operations and the steps may be rearranged or otherwise modified such that other implementations are possible. In some examples, aspects from two or more of the methods 900, 1000, 1100, 1200, and 1300 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, Universal Mobile Telecommunications System (UMTS), LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of evolved node B (eNBs) provide coverage for various geographical regions. For example, each eNB or base station may provide communication coverage for a macro cell, a small cell, or other types of cell. The term "cell" can be used to describe a base station, a carrier or CC associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for frequency division duplex (FDD) (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication, comprising:
    detecting, by a mobile device, a size of a hybrid automatic repeat request (HARQ) payload for reporting, in a subframe, HARQ feedback associated with transmissions on a plurality of component carriers (CCs);
    determining, by the mobile device, that at least one of a scheduling request (SR), a periodic channel state information (P-CSI) report, or a combination thereof is to be included in the subframe;
    selecting, by the mobile device, a physical uplink control channel (PUCCH) format from a set of PUCCH formats based at least in part on a comparison of a size of an uplink control message with a threshold, wherein the uplink control message comprises the HARQ payload and a payload for at least one of the SR or the P-CSI report; and
    transmitting, by the mobile device, the uplink control message in the subframe using the selected PUCCH format.

2. The method of claim 1, wherein the set of PUCCH formats comprises a first set of PUCCH formats associated with reporting HARQ feedback for one CC, a second set of PUCCH formats associated with reporting HARQ feedback for up to five CCs, or a third set of PUCCH formats associated with reporting HARQ feedback for more than five CCs.

3. The method of claim 1, wherein when the size of the uplink control message is greater than the threshold, selecting the PUCCH format comprises selecting, by the mobile device, a PUCCH format having a greater capacity than at least one other PUCCH format from the set of PUCCH formats.

4. The method of claim 3, wherein the threshold has a size of 22 bits.

5. The method of claim 1, further comprising:
    multiplexing the HARQ payload with P-CSI reports for two or more CCs configured for the UE, wherein determining that at least one of an SR or a P-CSI report is to be included in the subframe comprises identifying the P-CSI reports for the two or more CCs configured for the UE.

6. The method of claim 1, wherein the SR is determined to be present and the uplink control message comprises the HARQ payload and a payload for the SR.

7. The method of claim 1, wherein the SR and the P-CSI report are determined to be present and the uplink control message comprises the HARQ payload, a payload for the SR, and a payload for the P-CSI report.

8. The method of claim 1, wherein the P-CSI report comprises a report from at least one P-CSI process from a plurality of P-CSI processes for a CC configured for the UE, a report from a P-CSI process for at least one P-CSI subframe set from a plurality of P-CSI subframe sets for a CC configured for the UE, or a combination thereof.

9. The method of claim 1, wherein determining that at least one of the SR or the P-CSI report is to be included in the subframe comprises:
    determining to report a subset of P-CSI reports from a set of P-CSI reports.

10. The method of claim 9, wherein determining to report a subset of P-CSI reports from a set of P-CSI reports comprises:
    prioritizing P-CSI reports based on P-CSI report types, the prioritizing performed within a CC configured for the UE, or across CCs configured for the UE, or a combination thereof.

11. The method of claim 9, wherein determining to report a subset of P-CSI reports from a set of P-CSI reports comprises:
    prioritizing based on P-CSI report types, followed by prioritizing based on a CSI process identification, followed by prioritizing based on a CC index, followed by prioritizing based on a subframe set index.

12. The method of claim 1, further comprising:
    receiving signaling indicative of the size of the HARQ payload from a network node.

13. The method of claim 1, further comprising:
    receiving signaling indicative of whether to consider a presence of the at least one of the SR or the P-CSI report in the selection of the PUCCH format.

14. The method of claim 1, wherein the set of PUCCH formats comprises a first PUCCH format associated with P-CSI reporting for one CC and a second PUCCH format associated with P-CSI reporting for two or more CCs.

15. The method of claim 1, wherein the uplink control message is associated with a cell group among a plurality of cell groups.

16. A method of wireless communication, comprising:
    receiving a configuration supporting transmission of a plurality of periodic channel state information (P-CSI) reports during a same transmission time interval (TTI), wherein the plurality of P-CSI reports are associated with two or more of P-CSI reports for a plurality of subframe sets of a channel state information (CSI) process, P-CSI reports for a plurality of CSI processes of a component carrier (CC), or P-CSI reports for a plurality of CCs of a carrier aggregation (CA) configuration;
    determining that two or more P-CSI reports are due for transmission during the TTI; and
    transmitting at least one of the two or more P-CSI reports during the TTI according to a prioritization rule, wherein the prioritization rule is based at least in part on a payload capacity of a physical uplink control channel (PUCCH) format or payload sizes of the two or more P-CSI reports.

17. The method of claim 16, wherein the configuration supporting transmission of the plurality of P-CSI reports comprises at least one of a coordinated multipoint (CoMP) configuration, a CA configuration with one or more PUCCH groups, a dual-connectivity configuration, or an interference mitigation and traffic adaptation (IMTA) configuration.

18. The method of claim 16, wherein the prioritization rule comprises prioritizing by a CSI type, followed by a CSI process identification (ID), followed by a CC index, followed by a subframe set index.

19. The method of claim 16, wherein the CA configuration comprises a configuration of more than five CCs.

20. A mobile device, comprising:
    a processor;
    memory in electronic communication with the processor; and
    instructions stored in the memory and operable, when executed by the processor, to cause the mobile device to:
        detect a size of a hybrid automatic repeat request (HARQ) payload for reporting, in a subframe, HARQ feedback associated with transmissions on a plurality of component carriers (CCs);
        determine that at least one of a scheduling request (SR), a periodic channel state information (P-CSI) report, or a combination thereof is to be included in the subframe;

select a physical uplink control channel (PUCCH) format from a set of PUCCH formats based at least in part on a comparison of a size of an uplink control message with a threshold, wherein the uplink control message comprises the HARQ payload and a payload for at least one of the SR or the P-CSI report; and transmit the uplink control message in the subframe using the selected PUCCH format.

21. The mobile device of claim 20, wherein when the size of the uplink control message is greater than the threshold, the instructions to select the PUCCH format are operable to cause the mobile device to select a PUCCH format having a greater capacity than at least one other PUCCH format from the set of PUCCH formats.

22. The mobile device of claim 20, wherein the instructions are operable to cause the mobile device to:

multiplex the HARQ payload with P-CSI reports for two or more CCs configured for the UE, wherein determining that at least one of an SR or a P-CSI report is to be included in the subframe comprises identifying the P-CSI reports for the two or more CCs configured for the UE.

23. The mobile device of claim 20, wherein the instructions are operable to cause the mobile device to:

receive signaling indicative of the size of the HARQ payload from a network node.

24. The mobile device of claim 20, wherein the instructions are operable to cause the mobile device to:

receive signaling indicative of whether to consider a presence of the at least one of the SR or the P-CSI report in the selection of the PUCCH format.

25. The mobile device of claim 20, wherein the uplink control message is associated with a cell group among a plurality of cell groups.

26. An mobile device for wireless communication, comprising:

a processor;

memory in electronic communication with the processor; and instructions stored in the memory and operable, when executed by the processor, to cause the mobile device to:

receive a configuration supporting transmission of a plurality of periodic channel state information (P-CSI) reports during a same transmission time interval (TTI), wherein the plurality of P-CSI reports are associated with two or more of P-CSI reports for a plurality of subframe sets of a channel state information (CSI) process, P-CSI reports for a plurality of CSI processes of a component carrier (CC), or P-CSI reports for a plurality of CCs of a carrier aggregation (CA) configuration;

determine that two or more P-CSI reports are due for transmission during the TTI; and transmit at least one of the two or more P-CSI reports during the TTI according to a prioritization rule, wherein the prioritization rule is performed based at least in part on a payload capacity of a physical uplink control channel (PUCCH) format or payload sizes of the two or more P-CSI reports.

27. The mobile device of claim 26, wherein the configuration supporting transmission of the plurality of P-CSI reports comprises at least one of a coordinated multipoint (CoMP) configuration, a CA configuration with one or more PUCCH groups, a dual-connectivity configuration, or an interference mitigation and traffic adaptation (IMTA) configuration.

28. The mobile device of claim 26, wherein the prioritization rule comprises prioritizing a CSI type, followed by a CSI process identification (ID), followed by a CC index, followed by a subframe set index.

29. The mobile device of claim 20, wherein the set of PUCCH formats comprises a first set of PUCCH formats associated with reporting HARQ feedback for one CC, a second set of PUCCH formats associated with reporting HARQ feedback for up to five CCs, or a third set of PUCCH formats associated with reporting HARQ feedback for more than five CCs.

30. The mobile device of claim 20, wherein the instructions to determine that at least one of the SR or the P-CSI report is to be included in the subframe are operable to cause the mobile device to:

determine to report a subset of P-CSI reports from a set of P-CSI reports, wherein determining to report a subset of P-CSI reports from a set of P-CSI reports comprises prioritizing based on P-CSI report types, followed by prioritizing based on a CSI process identification, followed by prioritizing based on a CC index, followed by prioritizing based on a subframe set index.

* * * * *